(12) United States Patent
Kida et al.

(10) Patent No.: US 9,495,044 B2
(45) Date of Patent: Nov. 15, 2016

(54) IMAGE DISPLAY DEVICE

(71) Applicant: Japan Display Inc., Tokyo (JP)

(72) Inventors: Yoshitoshi Kida, Kanagawa (JP); Koji Noguchi, Kanagawa (JP); Koji Ishizaki, Kanagawa (JP); Kohei Azumi, Kanagawa (JP)

(73) Assignee: Japan Display Inc., Tokyo (JP)

( * ) Notice: Subject to any disclaimer, the term of this patent is extended or adjusted under 35 U.S.C. 154(b) by 112 days.

(21) Appl. No.: 13/743,024

(22) Filed: Jan. 16, 2013

(65) Prior Publication Data
US 2013/0241869 A1 Sep. 19, 2013

(30) Foreign Application Priority Data
Mar. 14, 2012 (JP) .................................. 2012-056921

(51) Int. Cl.
G06F 3/041 (2006.01)
G06F 3/044 (2006.01)

(52) U.S. Cl.
CPC .............. G06F 3/044 (2013.01); G06F 3/0412 (2013.01); G06F 3/0416 (2013.01)

(58) Field of Classification Search
CPC ..... G06F 3/0412; G06F 3/0416; G06F 3/044
See application file for complete search history.

(56) References Cited

U.S. PATENT DOCUMENTS

| 8,599,146 B2 | 12/2013 | Utsunomiya et al. | |
|---|---|---|---|
| 2008/0055270 A1* | 3/2008 | Cho et al. | 345/173 |
| 2008/0062139 A1* | 3/2008 | Hotelling et al. | 345/173 |
| 2008/0158183 A1* | 7/2008 | Hotelling et al. | 345/173 |
| 2008/0224971 A1* | 9/2008 | Utsunomiya et al. | 345/87 |
| 2011/0128254 A1* | 6/2011 | Teranishi et al. | 345/174 |
| 2011/0157093 A1* | 6/2011 | Bita | G02B 26/001 345/175 |
| 2011/0181519 A1* | 7/2011 | Tsai et al. | 345/173 |
| 2011/0261004 A1* | 10/2011 | Chen et al. | 345/174 |

(Continued)

FOREIGN PATENT DOCUMENTS

| CN | 101266348 | 9/2008 |
|---|---|---|
| CN | 101512461 | 8/2009 |
| CN | 102135829 | 7/2011 |

(Continued)

OTHER PUBLICATIONS

Taiwanese Office Action issued Nov. 14, 2014 in corresponding Taiwanese Application No. 101142103.
Chinese Office Action issued Aug. 18, 2016 in corresponding Chinese Application No. 2013100399337.

*Primary Examiner* — Larry Sternbane
(74) *Attorney, Agent, or Firm* — K&L Gates LLP

(57) ABSTRACT

An image display device includes: a first substrate which has a first surface and a second surface facing the first surface; a second substrate which has a first surface and a second surface facing the first surface, the first surface being arranged to face the second surface of the first substrate, and is made of a transparent material; and an image display layer which is arranged between the first substrate and the second substrate, wherein a driving electrode is provided on the first surface of the second substrate, a plurality of first detection electrodes are provided on the second surface of the second substrate, a second detection electrode is provided on the first substrate, the first detection electrodes and the driving electrode constitute a capacitance-type first touch panel unit, and the second detection electrode and the driving electrode constitute a capacitance-type second touch panel unit.

8 Claims, 33 Drawing Sheets

(56) References Cited

U.S. PATENT DOCUMENTS

2012/0235949 A1* 9/2012 Ligtenberg .................... 345/174
2013/0009905 A1* 1/2013 Castillo et al. ............... 345/174

FOREIGN PATENT DOCUMENTS

| JP | 07-084705 | 3/1995 |
| JP | 2009-244958 | 10/2009 |

* cited by examiner (EXAMPLE 6)

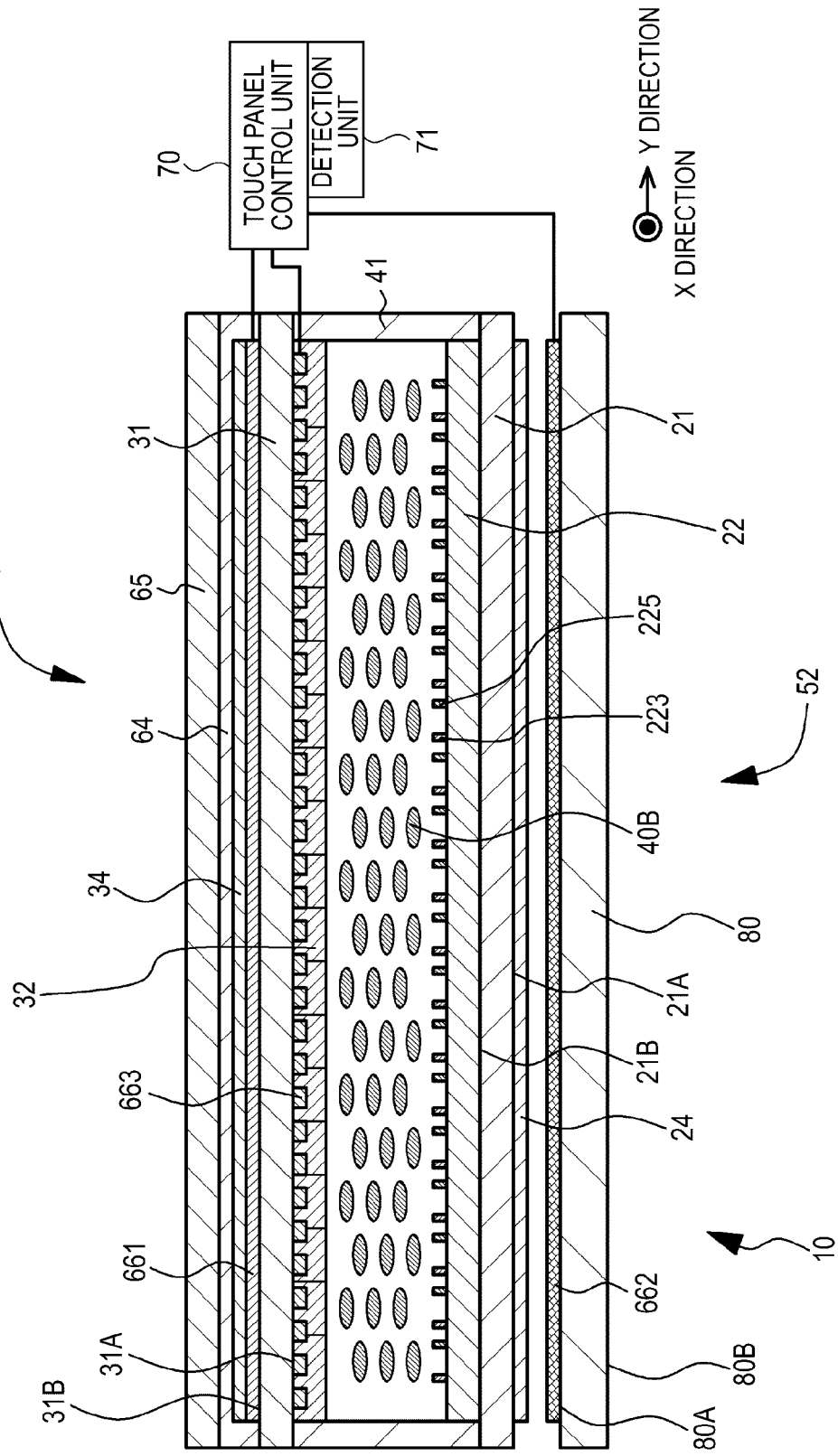

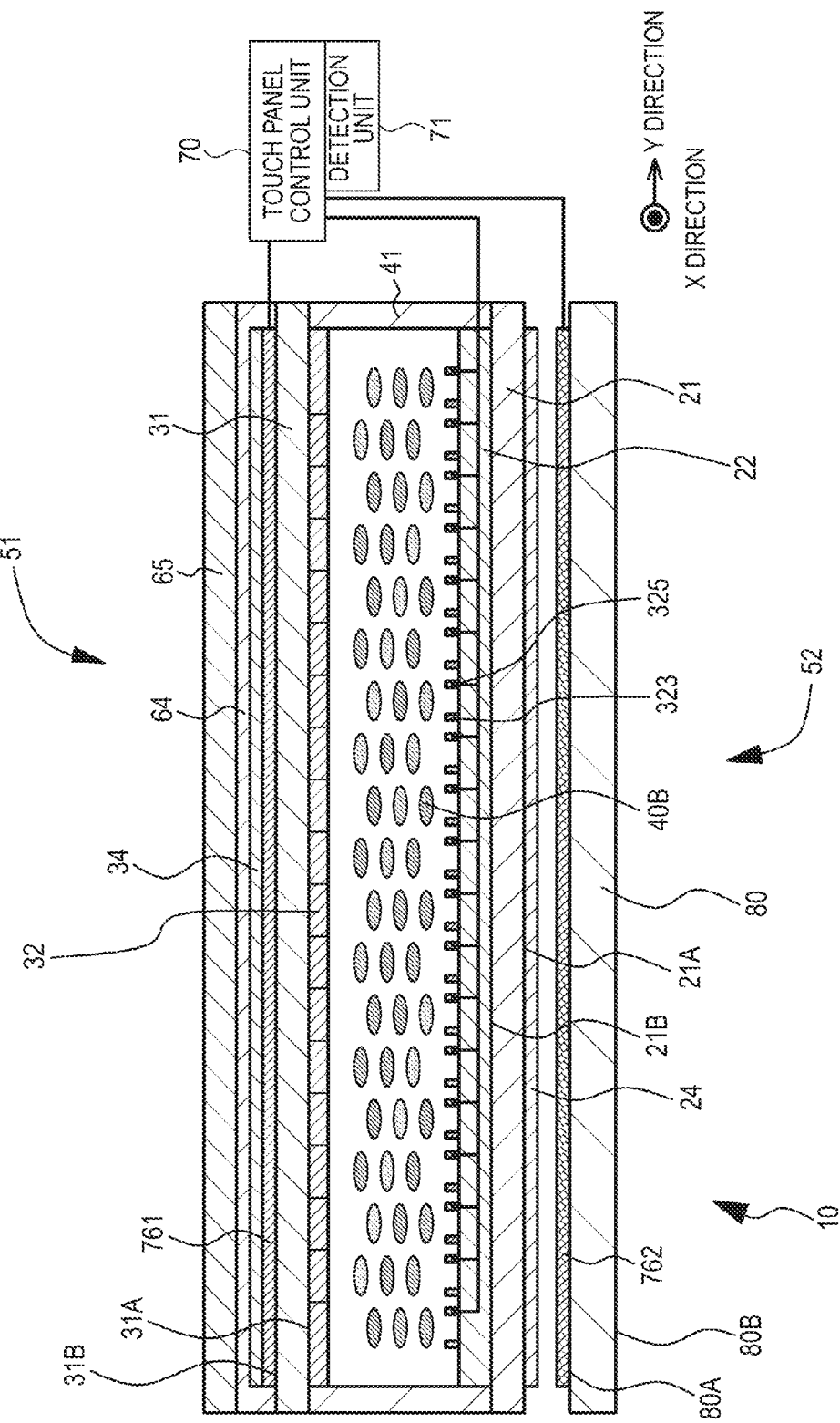

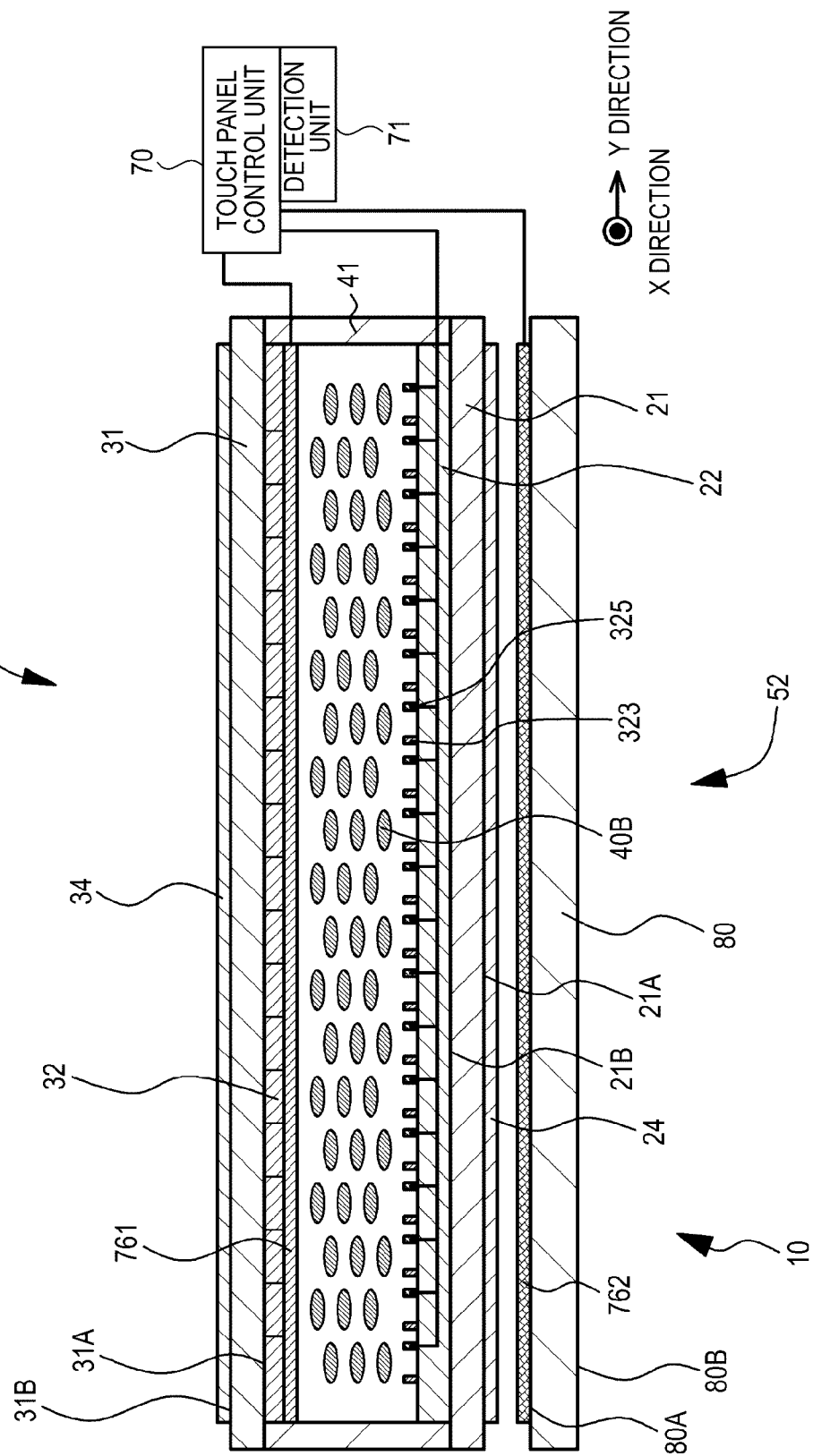

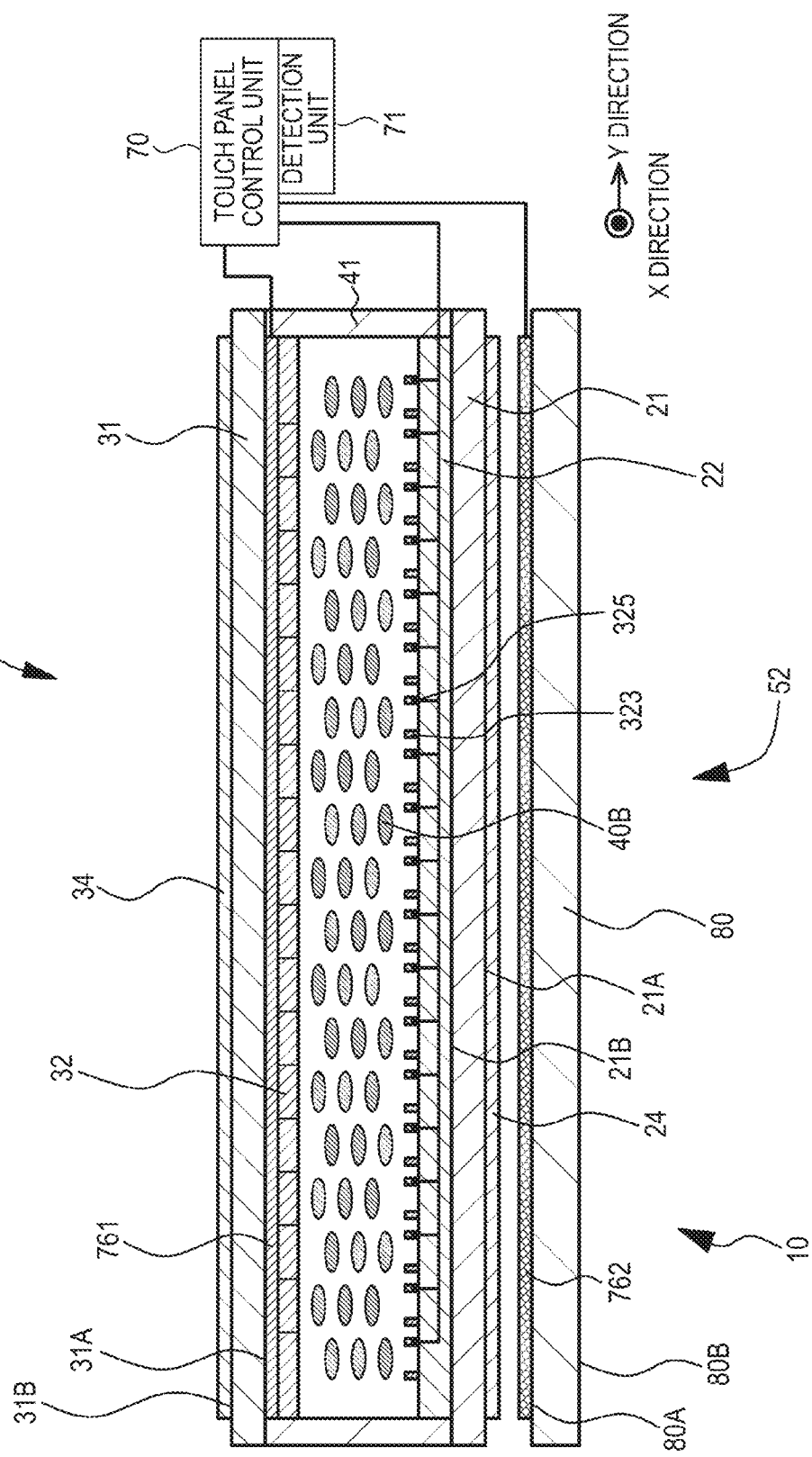

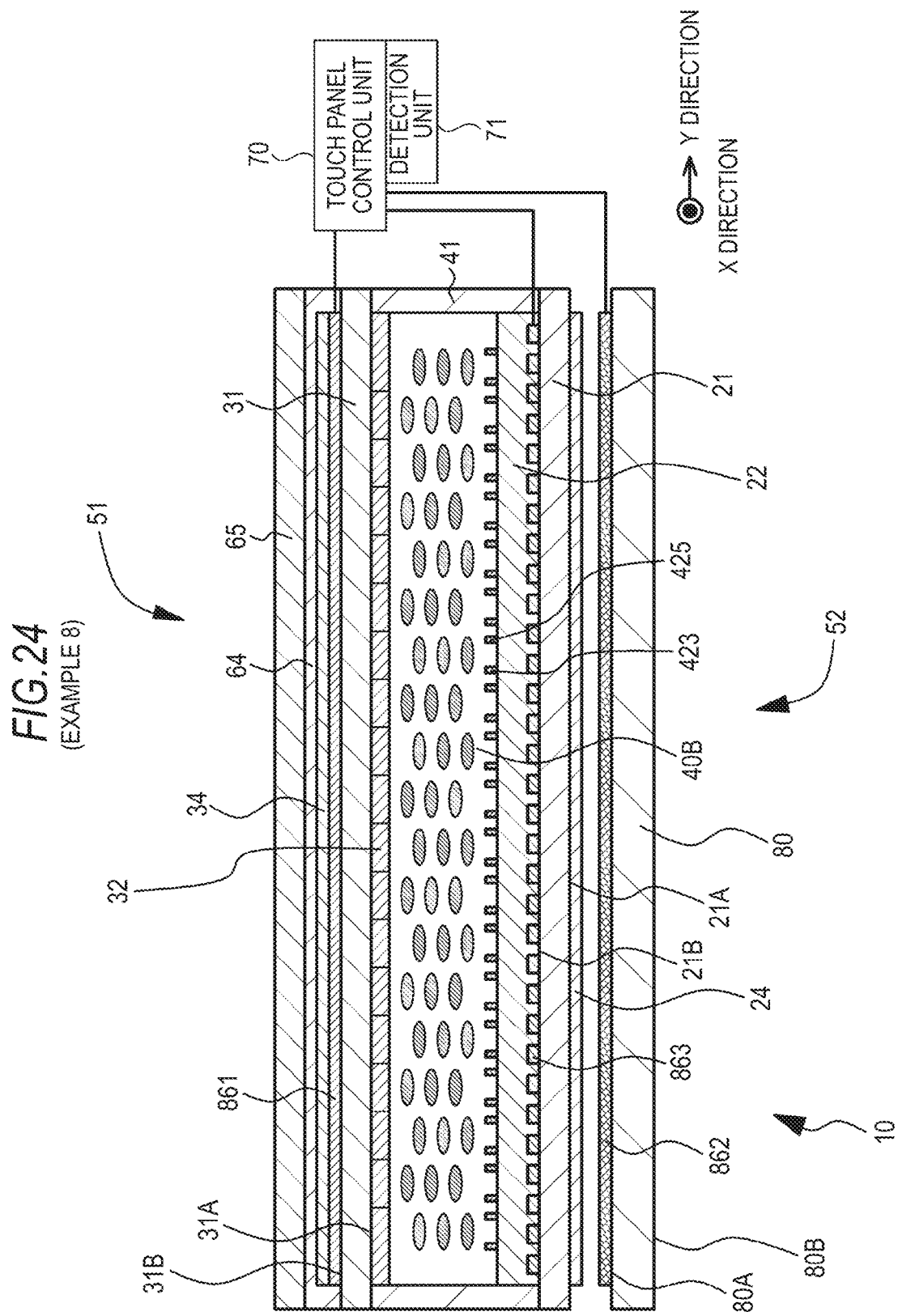
FIG.24 (EXAMPLE 8)

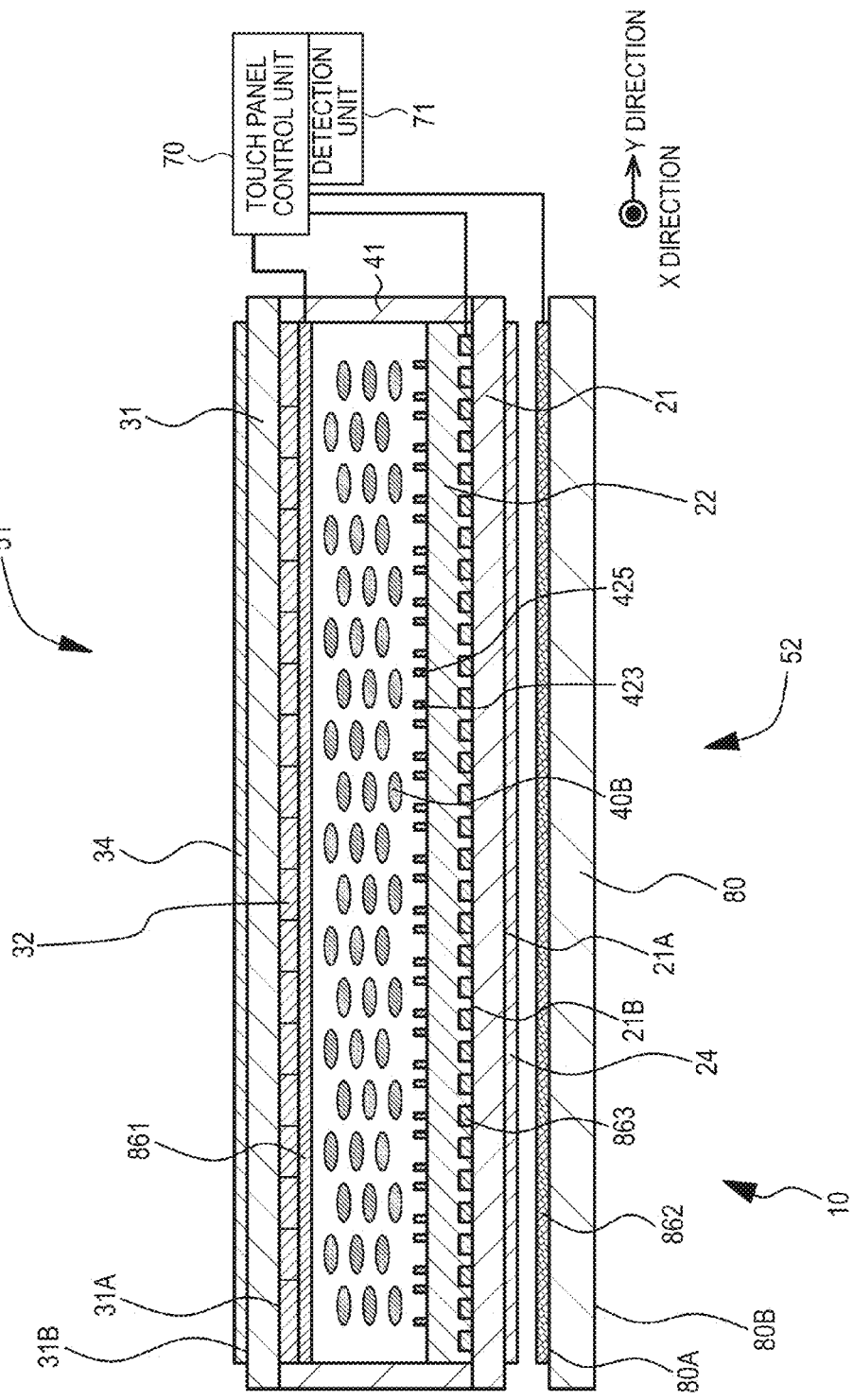

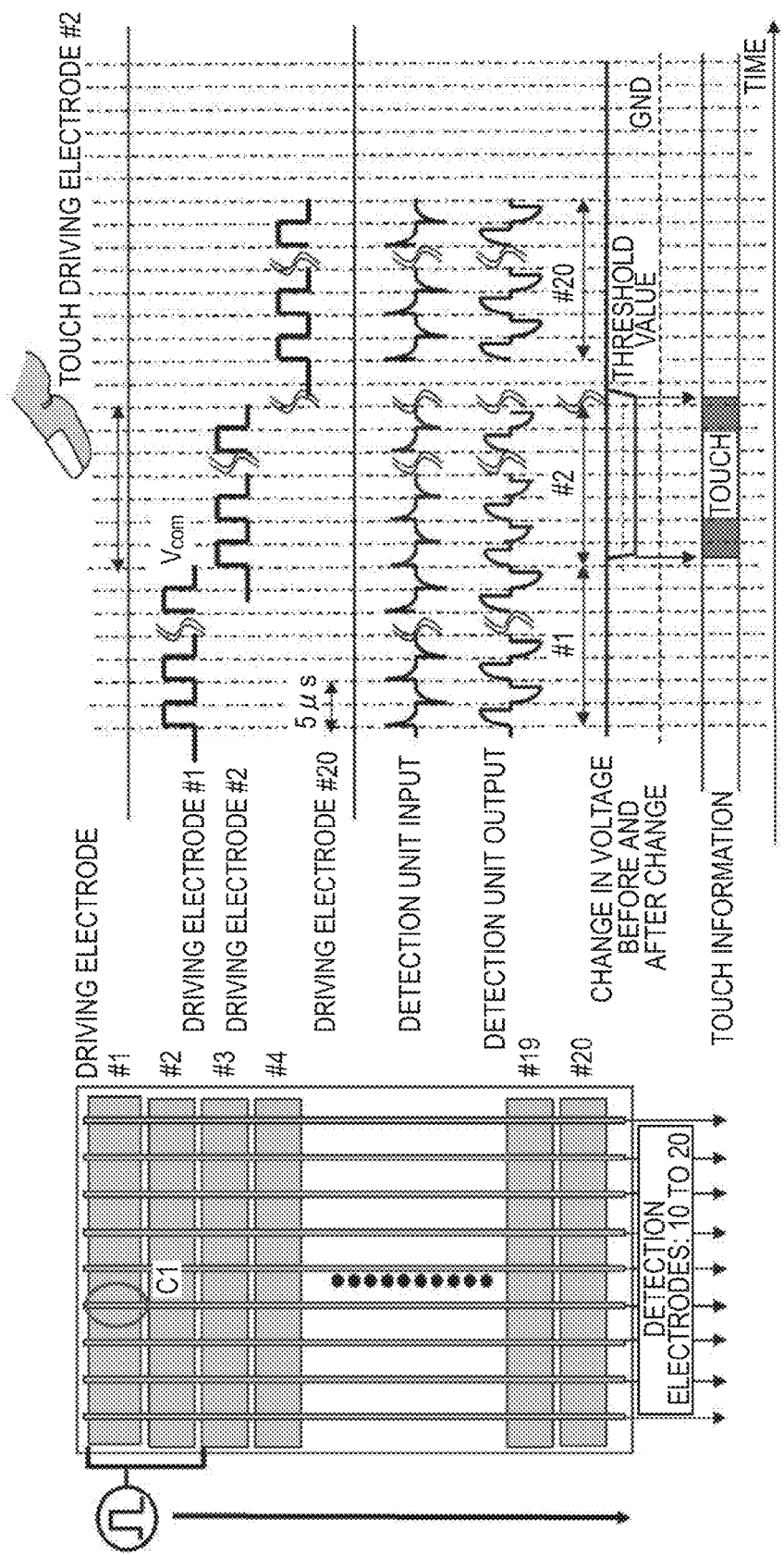

IMAGE DISPLAY DEVICE

CROSS REFERENCES TO RELATED APPLICATIONS

The present application claims priority to Japanese Priority Patent Application JP 2012-056921 filed in the Japan Patent Office on Mar. 14, 2012, the entire content of which is hereby incorporated by reference.

BACKGROUND

The present disclosure relates to an image display device, and in particular, to an image display device which has touch panel units on both surfaces of a display surface and a back surface.

A liquid crystal display in which a touch panel is incorporated is well known from, for example, JP-A-7-084705. In the liquid crystal display disclosed in JP-A-7-084705, the liquid crystal display and the touch panel are bonded together using a double-sided tape. For example, in an image display device which constitutes a portable game machine, there is a strong demand for providing touch panels on both surfaces of an image display unit so as to detect the position of a finger of an image observer on the display surface (front surface or top surface) and the back surface of the image display unit.

SUMMARY

However, when the touch panels are simply provided on both surfaces of the image display device, the total thickness increases, and the weight significantly increases, causing a significant increase in manufacturing costs. A liquid crystal display in which a touch panel is incorporated is well known from, for example, JP-A-2009-244958. Meanwhile, in JP-A-2009-244958, there is no description of a specific configuration in which the touch panels are provided on both surfaces of the liquid crystal display.

Accordingly, it is desirable to provide an image display device having touch panel units on both surfaces of a display surface and a back surface without causing an increase in total thickness, a significant increase in weight, and a significant increase in manufacturing costs.

A first embodiment of the present disclosure is directed to an image display device including a first substrate which has a first surface and a second surface facing the first surface, a second substrate which has a first surface and a second surface facing the first surface, the first surface being arranged to face the second surface of the first substrate, and is made of a transparent material, and an image display layer which is arranged between the first substrate and the second substrate. A driving electrode is provided on the first surface of the second substrate, a plurality of first detection electrodes are provided on the second surface of the second substrate, a second detection electrode is provided on the first substrate, the first detection electrodes and the driving electrode constitute a capacitance-type first touch panel unit, and the second detection electrode and the driving electrode constitute a capacitance-type second touch panel unit.

A second embodiment of the present disclosure is directed to an image display device including a first substrate which has a first surface and a second surface facing the first surface, a second substrate which has a first surface and a second surface facing the first surface, the first surface being arranged to face the second surface of the first substrate, and is made of a transparent material, and an image display layer which is arranged between the first substrate and the second substrate. A driving electrode is provided on the second surface of the first substrate, a plurality of first detection electrodes are provided on the second substrate, a second detection electrode is provided on the first surface of the first substrate, the first detection electrodes and the driving electrode constitute a capacitance-type first touch panel unit, and the second detection electrode and the driving electrode constitute a capacitance-type second touch panel unit.

A third embodiment of the present disclosure is directed to an image display device including a first substrate which has a first surface and a second surface facing the first surface, a second substrate which has a first surface and a second surface facing the first surface, the first surface being arranged to face the second surface of the first substrate, and is made of a transparent material, an image display layer which is made of liquid crystal arranged between the first substrate and the second substrate, and a sheet light source device which is arranged on the first surface of the first substrate. A driving electrode is provided on the first surface of the second substrate, a plurality of first detection electrodes are provided on the second surface of the second substrate, a second detection electrode is provided on the sheet light source device, the first detection electrodes and the driving electrode constitute a capacitance-type first touch panel unit, and the second detection electrode and the driving electrode constitute a capacitance-type second touch panel unit.

A fourth embodiment of the present disclosure is directed to an image display device including a first substrate which has a first surface and a second surface facing the first surface, a second substrate which has a first surface and a second surface facing the first surface, the first surface being arranged to face the second surface of the first substrate, and is made of a transparent material, an image display layer which is made of liquid crystal arranged between the first substrate and the second substrate, and a sheet light source device which is arranged on the first surface of the first substrate. A driving electrode is provided on the second surface of the first substrate, a plurality of first detection electrodes are provided on the second substrate, a second detection electrode is provided on the sheet light source device, the first detection electrodes and the driving electrode constitute a capacitance-type first touch panel unit, and the second detection electrode and the driving electrode constitute a capacitance-type second touch panel unit.

In the image display device according to the first or second embodiment of the present disclosure, the first touch panel unit and the second touch panel unit are incorporated in the image display device, and in the image display device according to the third or fourth embodiment of the present disclosure, the first touch panel unit is incorporated in the image display device, and a part of the second touch panel unit is incorporated in the image display device, and the remaining part of the second touch panel unit is incorporated in the sheet light source device. Therefore, it is possible to provide an image display device having touch panel units on both surfaces of the display surface and the back surface without causing an increase in total thickness, a significant increase in weight, and a significant increase in manufacturing costs.

Additional features and advantages are described herein, and will be apparent from the following Detailed Description and the figures.

BRIEF DESCRIPTION OF THE FIGURES

FIG. 20 is a schematic sectional view of an image display device of Example 6 [Case: 6-E].

FIG. 21 is a schematic sectional view of an image display device of Example 7 [Case: 7-A].

FIG. 22 is a schematic sectional view of an image display device of Example 7 [Case: 7-E].

FIG. 23 is a schematic sectional view of an image display device of Example 7 [Case: 7-G].

FIG. 24 is a schematic sectional view of an image display device of Example 8 [Case: 8-A].

FIG. 25 is a schematic sectional view of an image display device of Example 8 [Case: 8-E].

FIG. 30 is a schematic plan view of a first touch panel unit and an operation timing chart of a touch panel control unit.

DETAILED DESCRIPTION

Figure 1:
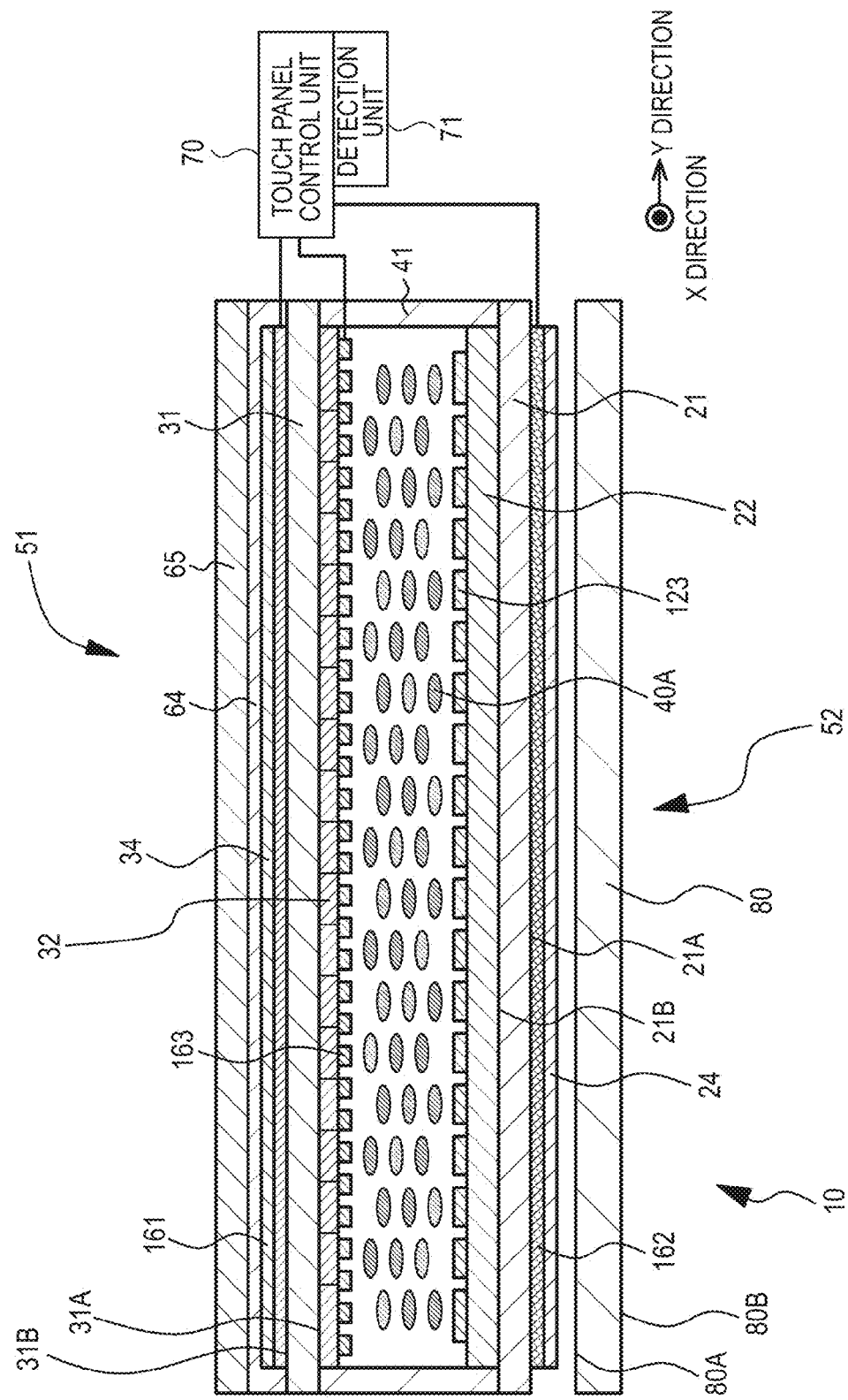
FIG. 1 is a schematic sectional view of an image display device of Example 1 [Case: 1-A].

Although the present disclosure will be hereinafter described on the basis of examples with reference to the drawings, the present disclosure is not limited to the examples, and various numerical values or materials in the examples are for illustration. The description will be provided in the following order.

1. Overall description relating to image display device according to first to fourth embodiments of the present disclosure 2. Example 1 (an image display device according to a first embodiment of the present disclosure)

3. Example 2 (a modification of Example 1)

4. Example 3 (an image display device according to a second embodiment of the present disclosure)

5. Example 4 (a modification of Example 3)

6. Example 5 (an image display device according to a third embodiment of the present disclosure)

7. Example 6 (a modification of Example 5)

8. Example 7 (an image display device according to a fourth embodiment of the present disclosure)

9. Example 8 (a modification of Example 7)

10. Example 9 (detection unit) and others

Overall Description of Image Display Device According to First to Fourth Embodiments of the Present Disclosure In an image display device according to first to fourth embodiments of the present disclosure, a form in which a driving electrode doubles as an electrode for driving an image display layer may be implemented.

In the image display device according to the first to fourth embodiments of the present disclosure including the foregoing preferred form, a configuration may be made in which each first detection electrode, the second detection electrode, and the driving electrode are connected to a detection unit, and the detection unit includes a first capacitor connected in series to a first capacitive unit constituted by the first detection electrode and the driving electrode, and a second capacitor connected in series to a second capacitive unit constituted by the second detection electrode and the driving electrode. In this case, the detection unit may further include a first operational amplifier connected in parallel to the first capacitor, and a second operational amplifier connected in parallel to the second capacitor.

Alternatively, in the image display device according to the first to fourth embodiments of the present disclosure including the foregoing preferred form, a configuration may be made in which each first detection electrode, the second detection electrode, and the driving electrode are connected to a detection unit, the detection unit includes a variable-capacitance capacitor connected in series to a first capacitive unit constituted by the first detection electrode and the driving electrode and a second capacitive unit constituted by the second detection electrode and the driving electrode, and the capacitance of the capacitor changes between during the detection of the first touch panel unit and during the detection of the second touch panel unit. In this case, a configuration in which the detection unit further includes an operational amplifier connected in parallel to the capacitor may be made.

Alternatively, in the image display device according to the first to fourth embodiments of the present disclosure including the foregoing preferred form, a configuration in which each first detection electrode, the second detection electrode, and the driving electrode are connected to the detection unit, the detection unit includes a capacitor connected in series to a first capacitive unit constituted by the first detection electrode and the driving electrode and a second capacitive unit constituted by the second detection electrode and the driving electrode, the detection unit further includes an operational amplifier connected in parallel to the capacitor, and a reference voltage of the operational amplifier changes between during the detection of the first touch panel unit and during the detection of the second touch panel unit may be made.

As the image display device according to the first to fourth embodiments of the present disclosure, liquid crystal displays having a well-known configuration or structure, specifically, for example, liquid crystal displays using liquid crystal in various modes (longitudinal electric field mode and lateral electric field mode), such as TN (twisted nematic), VA (vertical alignment), ECB (electric field control birefringence), FFS (fringe field switching), and IPS (in-plane switching), may be provided. As the image display device according to the first and second embodiments of the present disclosure, an organic electroluminescence display (organic EL display) and an electronic paper having a well-known configuration or structure may be provided.

Although in the image display device according to the first to fourth embodiments of the present disclosure, as the arrangement of the first detection electrode, the second detection electrode, and the driving electrode, a grid arrangement may be used, the present disclosure is not limited thereto, and a wire sensor arrangement may be used.

An image display device when the image display device according to the first or second embodiment of the present disclosure is a liquid crystal display or the image display device according to the third or fourth embodiment of the present disclosure is a liquid crystal display having a well-known configuration or structure, includes a first polarizing plate, a first electrode, a second electrode, a color filter, and a second polarizing plate, in addition to a first substrate, a second substrate, an image display layer made of liquid crystal, and a thin film transistor (TFT) or the like for generating an image in the image display layer is formed in the first substrate. The first electrode is formed on an insulating interlayer formed on the first substrate and connected to the TFT through a wiring or a contact hole. The second electrode is usually a common electrode. The second electrode is formed on the second substrate or is formed on the first substrate. In the latter case, the first electrode and the second electrode are formed within the same plane, or the first electrode is positioned on the lower side and the second electrode is positioned on the upper side, or the first electrode is positioned on the upper side and the second electrode is positioned on the lower side. An image generated in the image display layer is recognized by a user (image observer) through, for example, the color filter, the second polarizing plate, the second substrate, and the first touch panel unit (the arrangement order and the lamination order will be described below). In the image display device according to the first to fourth embodiments of the present disclosure, the second electrode which drives the image display layer may become a driving electrode. In this case, for example, the first detection electrode and the second detection electrode may be patterned so as to extend in the first direction, and the driving electrode (second electrode) may be patterned so as to extend in the second direction different from the first direction (for example, in the second direction perpendicular to the first direction). A detection electrode may be incorporated in a polarizing plate depending on the configuration or structure of the image display device. As a liquid crystal display, a transmissive liquid crystal display, a reflective liquid crystal display, or a semi-transmissive/semi-reflective liquid crystal display may be provided.

When the image display device according to the first or second embodiment of the present disclosure is an organic EL display, the organic EL display may have a well-known configuration or structure. The image display layer is an organic layer having a light-emitting layer, and the organic layer is interposed between the first electrode and the second electrode. A TFT or the like for generating an image in the image display layer is formed in the first substrate, and the TFT or the like is coated with an insulating interlayer. When the organic EL display is a so-called top emission type, the first electrode is formed on the insulating interlayer formed on the first substrate and connected to the TFT through a wiring or a contact hole. The second electrode is usually a common electrode. The second substrate and the second electrode are bonded together through an adhesive layer. An image generated in the image display layer is recognized by the user (image observer) through the second electrode, the second substrate, and the first touch panel unit. When the organic EL display is a so-called bottom emission type, a TFT or the like for generating an image in the image display layer is formed on the second substrate, and the TFT or the like is coated with an insulating interlayer. The second electrode is formed on the insulating interlayer formed on the second substrate. The first substrate and the first electrode are bonded together through an adhesive layer. An image generated in the image display layer is recognized by the user (image observer) through the second electrode, the second substrate, and the first touch panel unit. When the image display device according to the first embodiment of the present disclosure is an organic EL display, the second electrode which drives the image display layer may become a driving electrode. In this case, for example, the first detection electrode and the second detection electrode may be patterned so as to extend in the first direction, and the driving electrode (second electrode) may be patterned so as to extend in the second direction different from the first direction (for example, the second direction perpendicular to the first direction). When the image display device according to the second embodiment of the present disclosure is an organic EL display, for example, the first detection electrode and the second detection electrode may be patterned so as to extend in the first direction, and the driving electrode may be patterned so as to extend in the second direction different from the first direction (for example, the second direction perpendicular to the first direction).

The image display device according to the first to fourth embodiments of the present disclosure including various preferable forms and configuration described above may be incorporated in, for example, a portable game machine, a terminal of a game machine, a smart phone, a tablet personal computer, a laptop personal computer, an electronic book terminal, or the like. Although in the image display device according to the first to fourth embodiments of the present disclosure, the first touch panel unit and the second touch panel unit are a surface capacitance-type touch panel, a projective capacitance-type touch panel is preferably used and is of a so-called in-cell type. An image displayed in the image display layer can be recognized by the user (image observer) through the second substrate and the first touch panel unit. An image relating to the second touch panel unit may be displayed in the image display layer or may not be displayed.

The first detection electrode is made of a transparent conductive material (for example, ITO). The second detection electrode and the driving electrode may be made of a transparent conductive material, and in some cases, may be made of a non-transparent conductive material. If necessary, the first detection electrode is coated with a transparent coating member, for example, a glass substrate, a plastic film, a plastic sheet, or a plastic substrate. If necessary, the second detection electrode is also coated with a coating member, for example, a glass substrate, a plastic film, a plastic sheet, or a plastic substrate.

Example 1

Example 1 relates to an image display device according to the first embodiment of the present disclosure. As shown in FIGS. 1 to 25 which are schematic sectional views, an image display device 10 of Example 1 or each of Examples 2 to 10 described below includes a first substrate 21 which has a first surface 21A and a second surface 21B facing the first surface 21A, a second substrate 31 which has a first surface 31A and a second surface 31B facing the first surface 31A, the first surface 31A being arranged to face the second surface 21B of the first substrate 21, and is made of a transparent material, and image display layers (specifically, liquid crystal layers) 40A and 40B which are arranged between the first substrate 21 and the second substrate 31. A sheet light source device 80 is arranged on the first surface of the first substrate 21. The sheet light source device 80 specifically has a light guide plate having a well-known configuration or structure, and a light source (not shown) is arranged on the side of the sheet light source device 80.

Figure 31:
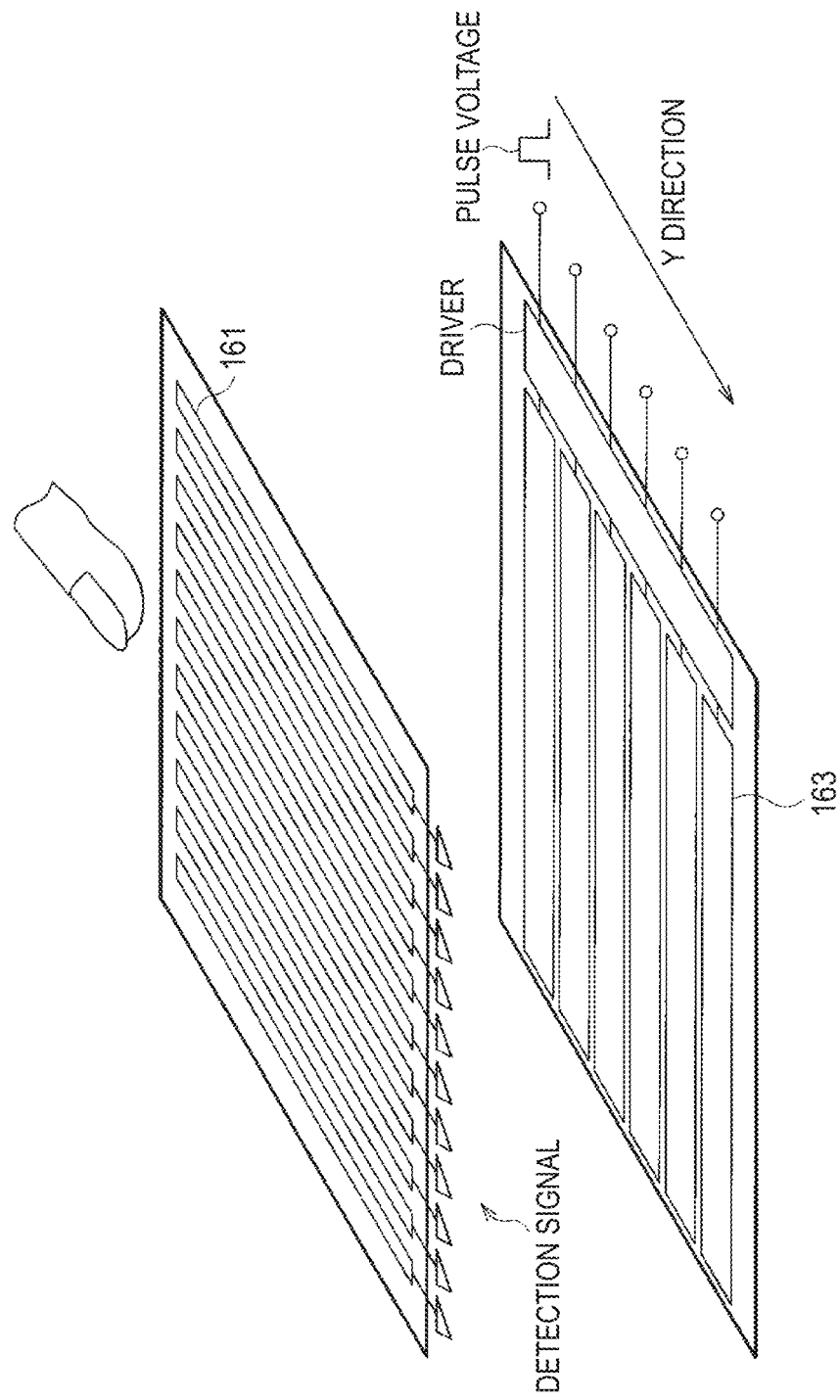
FIG. 31 is an exploded perspective view schematically showing the arrangement state of a first detection electrode and a driving electrode.

In the image display device 10 of Example 1, as shown in FIG. 1 which is a schematic sectional view or as schematically shown in FIG. 31 which shows the arrangement state (exploded perspective view) of a first detection electrode 161 and a driving electrode 163, the driving electrode 163 is provided on the first surface of the second substrate 31, a plurality of first detection electrodes 161 are provided on the second surface 31B of the second substrate 31, the second detection electrode 162 is provided on the first substrate 21, the first detection electrode 161 and the driving electrode 163 constitute a capacitance-type first touch panel unit 51, and the second detection electrode 162 and the driving electrode 163 constitute a capacitance-type second touch panel unit 52. The driving electrode 163 doubles as an electrode (specifically, a second electrode or a common electrode) which drives a liquid crystal layer 40A. That is, a pulse voltage (pulse signal) $V_{com}$ is applied to the driving electrode 163. As the pulse voltage (pulse signal) $V_{com}$, an alternating-current square wave having a frequency of several kHz to hundreds of kHz may be used.

Figure 26A:
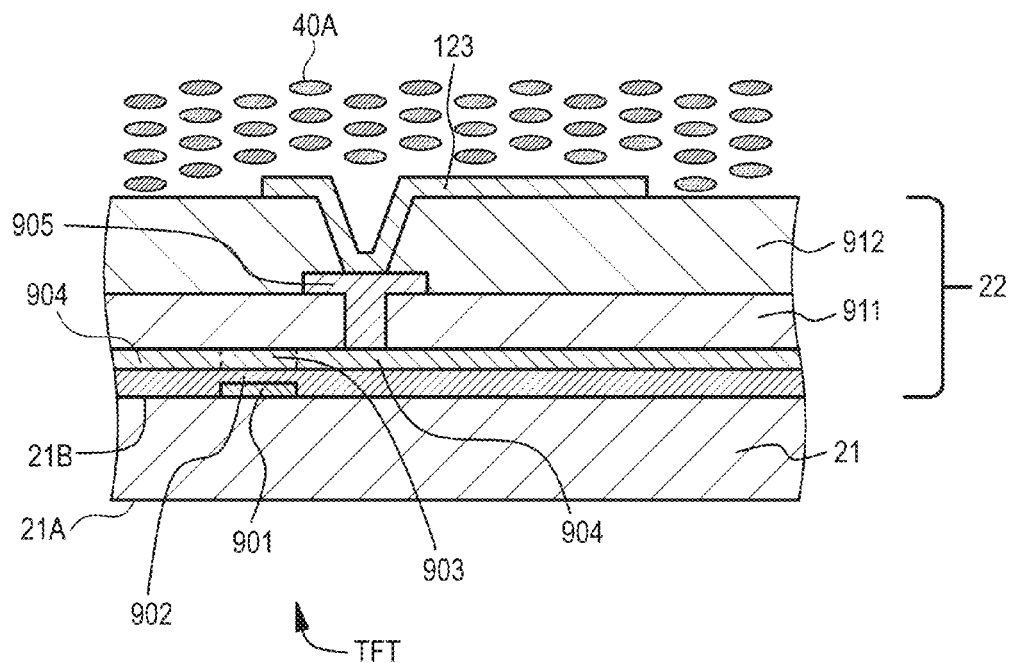
FIG. 26A is a schematic partial sectional view of a liquid crystal cell constituting the image display device of Examples 1 and 5.

As shown in FIG. 26A which is a schematic partial sectional view of a liquid crystal cell, a TFT having a gate electrode 901, a gate insulating layer 902, a channel forming region 903, and a source/drain region 904 is formed on the second surface 21B of the first substrate (pixel substrate) 21 made of a glass substrate, and the TFT is coated with an insulating interlayer (a first insulating interlayer 911 and a second insulating interlayer 912). A first electrode (pixel electrode) 123 formed of a transparent conductive material (for example, ITO) in a matrix is formed on the insulating interlayer 912. The first electrode 123 is connected to the TFT through a contact hole 905. In FIGS. 1 to 25, the TFT and the insulating interlayer are collectively represented by a single layer as a layer 22 (for convenience, called "TFT layer 22"), and a specific TFT is not shown. An alignment film is formed on the first electrode (pixel electrode) 123, and is not shown. A color filter 32 is formed on the first surface 31A of the second substrate (counter substrate) 31 facing the first substrate 21, and a plurality of patterned driving electrodes 163 formed of a transparent conductive material (for example, ITO) are formed on the color filter 32. An alignment film is formed on the driving electrode 163, and is not shown. The color filter 32 has color filter layers of three colors, for example, of red, green, and blue, and these color filter layers are arrayed arranged periodically. Reference numeral 41 denotes a sealing member which seals the outer peripheral portion of the first substrate 21 and the second substrate 31. The first electrode (pixel electrode) 123, the liquid crystal layer 40A, the second electrode (common electrode) 163, and the color filter 32 constitute one display cell (subpixel), and a set of a red display subpixel, a green display subpixel, and a blue display subpixel constitute one pixel. The liquid crystal layer 40A modulates light passing therethrough depending on the state of the electric field, and is made of liquid crystal in a longitudinal electric field mode, for example, TN (twisted nematic), VA (vertical alignment), or ECB (electric field control birefringence). Wirings, such as a source line which supplies a pixel signal to the first electrode 123 and a gate line which drives the TFT, are formed in the TFT layer 22 along with a driver for driving the first electrode 123 or the TFT, and are not shown. The TFT is connected to a driving circuit (not shown) which drives the image display device (not shown).

The first detection electrode 161 is formed on the second surface 31B of the second substrate 31, and a second polarizing plate 34 is arranged on the first detection electrode 161. The lamination structure of the first detection electrode 161 and the second polarizing plate 34 is bonded to a transparent coating member 65 made of a glass substrate by a transparent adhesive layer 64. The second detection electrode 162 is formed on the first surface 21A of the first substrate 21, and a first polarizing plate 24 is arranged on the second detection electrode 162. The lamination structure of the second detection electrode 162 and the first polarizing plate 24 is fixed to the first substrate 21 by a transparent adhesive layer (not shown). The first touch panel unit 51 and the second touch panel unit 52 are of a grid type. A plurality of patterned first detection electrodes 161 and a plurality of patterned second detection electrodes 162 are arranged, for example, in the Y direction (second direction), and a plurality of driving electrodes 163 are arranged, for example, in the X direction (first direction). The first detection electrodes 161, the second detection electrodes 162, and the driving electrodes 163 are made of a transparent conductive material (for example, ITO), and are connected to a touch panel control unit 70 including a detection unit (detection circuit) 71. The detection unit 71 will be described below.

The coating member 65 corresponds to a touch surface on which the user touches the first touch panel unit 51. An icon which prompts the user to touch the first touch panel unit 51 with his/her finger is displayed at a predetermined position of the image display device 10. If the finger of the user touches a portion of the coating member 65 positioned above a predetermined icon, the touch can be detected by the first detection electrode 161 and the driving electrode 163. If the finger of the user touches a second surface 80B opposite to a first surface 80A of the sheet light source device 80 facing the first substrate 21, the touch can be detected by the second detection electrode 162 and the driving electrode 163.

FIG. 30 is a schematic plan view of the first touch panel unit 51 and an operation timing chart of the touch panel control unit 70. In the schematic plan view of the first touch panel unit 51, 20 driving electrodes are represented by #1 to #20. A first detection electrode is represented by "detection electrode". A first capacitive unit constituted by a first detection electrode and a driving electrode is represented by $C_1$.

The pulse voltage $V_{com}$ is sequentially sent and scanned from the touch panel control unit 70 to the driving electrode 163 in a time-division manner. If the finger approaches or touches near the overlapping region of the first detection electrode 161 and the driving electrode 163, the voltage across the first detection electrode 161 and the driving electrode 163 changes depending on the capacitance of the finger. The change in voltage is detected in the touch panel control unit 70, thereby detecting which portion of the first touch panel unit 51 the finger touches. Similarly, if the finger approaches or touches near the overlapping region of the second detection electrode 162 and the driving electrode 163, the voltage across the second detection electrode 162 and the driving electrode 163 changes depending on the capacitance of the finger. The change in voltage is detected in the touch panel control unit 70, thereby detecting which portion of the second touch panel unit 52 the finger touches. In the operation timing chart of FIG. 30, it is assumed that the finger of the user touches the driving electrode #2.

The layer configuration in the image display device of Example 1 may be modified in various ways. The modifications are shown in Tables 1A to 1D described below, and the layer configuration in the image display device of Example 1 shown in FIG. 1 corresponds to [Case: 1-A]. Although in [Case: 1-G] to [Case: 1-L], the driving electrode 163 and the second electrode 125 are separately provided, the driving electrode and the second electrode may be at the same potential. FIGS. 2, 3, 4, 5, and 6 are schematic sectional views of an image display device in [Case: 1-B], [Case: 1-C], [Case: 1-D], [Case: 1-G], and [Case: 1-J].

TABLE 1A

Figure 2:
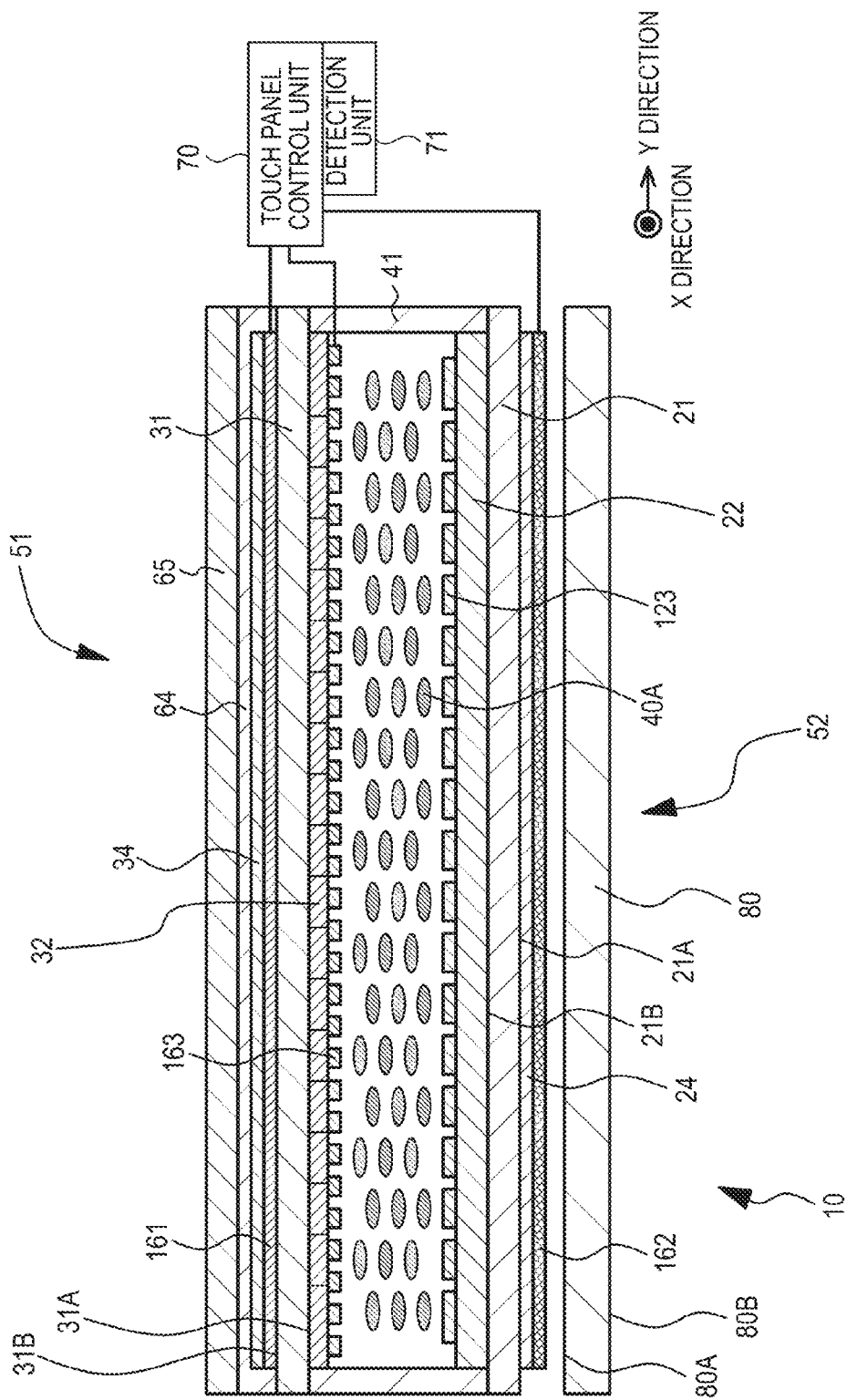
FIG. 2 is a schematic sectional view of an image display device of Example 1 [Case: 1-B].
Figure 3:
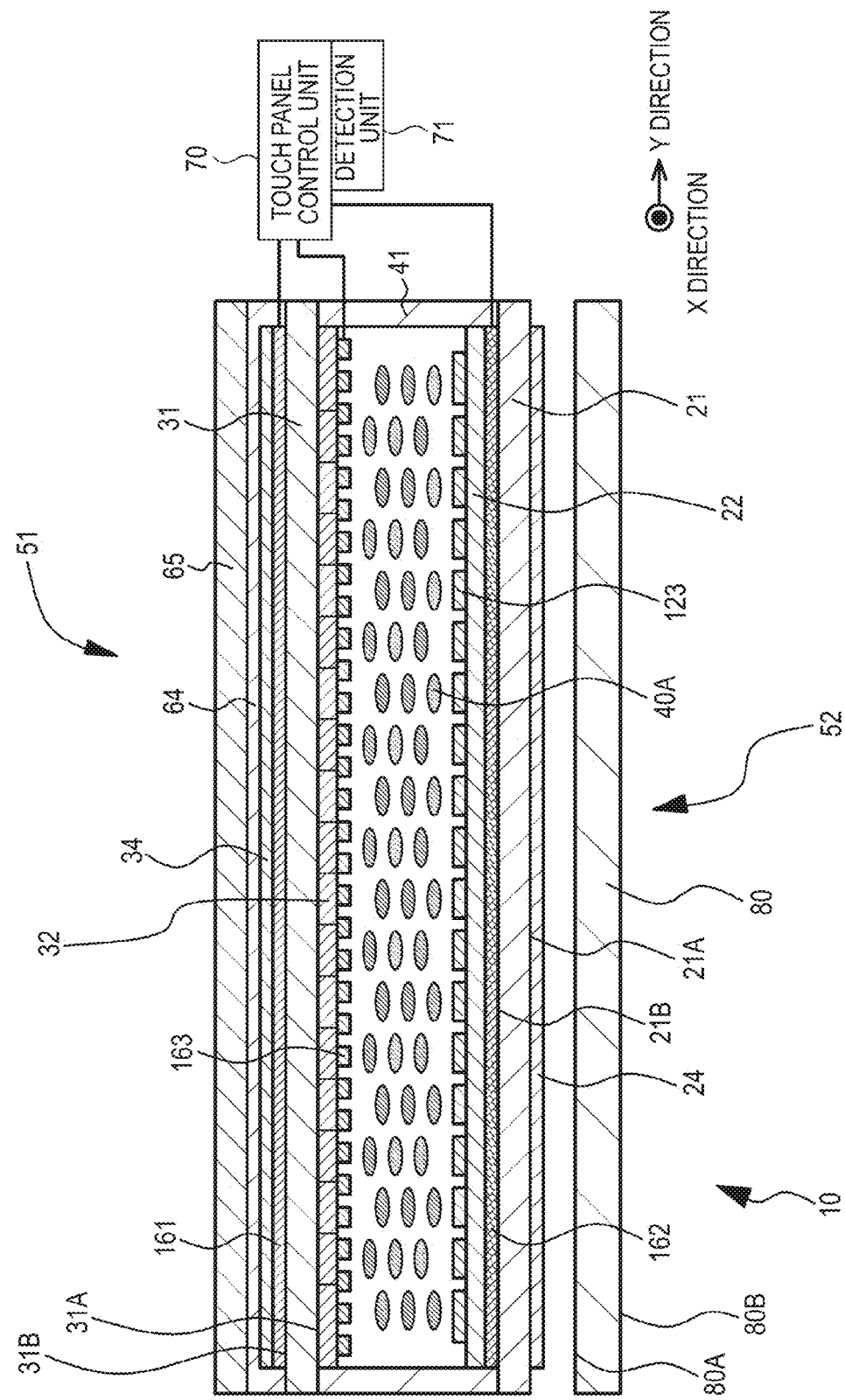
FIG. 3 is a schematic sectional view of an image display device of Example 1 [Case: 1-C].

| [Case: 1-A] | [Case: 1-B] | [Case: 1-C] |
| --- | --- | --- |
| Second Polarizing Plate | Second Polarizing Plate | Second Polarizing Plate |
| First Detection Electrode | First Detection Electrode | First Detection Electrode |
| Second Substrate | Second Substrate | Second Substrate |
| Color Filter Layer | Color Filter Layer | Color Filter Layer |
| Second Electrode | Second Electrode | Second Electrode |
| Doubling As Driving Electrode | Doubling As Driving Electrode | Doubling As Driving Electrode |
| Liquid Crystal Layer | Liquid Crystal Layer | Liquid Crystal Layer |
| (Longitudinal Electric Field Mode) | (Longitudinal Electric Field Mode) | (Longitudinal Electric Field Mode) |
| First Electrode | First Electrode | First Electrode |
| TFT Layer | TFT Layer | TFT Layer |
|  |  | Second Detection Electrode |
| First Substrate | First Substrate | First Substrate |
| Second Detection Electrode |  |  |
| First Polarizing Plate | First Polarizing Plate | First Polarizing Plate |
|  | Second Detection Electrode |  |
| See FIG. 1 | See FIG. 2 | See FIG. 3 |

TABLE 1B

Figure 4:
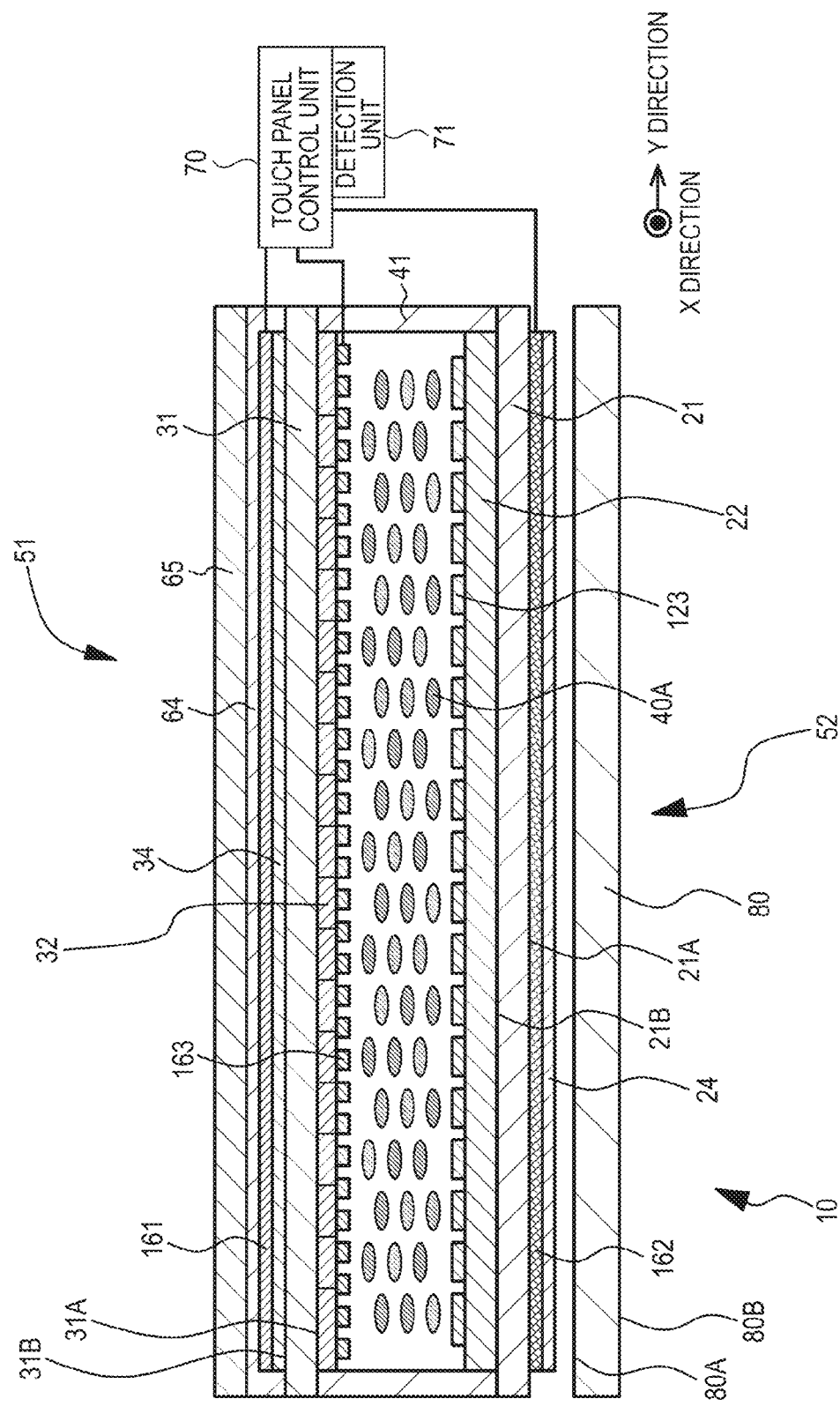
FIG. 4 is a schematic sectional view of an image display device of Example 1 [Case: 1-D].

| [Case: 1-D] | [Case: 1-E] | [Case: 1-F] |
| --- | --- | --- |
| First Detection Electrode | First Detection Electrode | First Detection Electrode |
| Second Polarizing Plate | Second Polarizing Plate | Second Polarizing Plate |
| Second Substrate | Second Substrate | Second Substrate |
| Color Filter Layer | Color Filter Layer | Color Filter Layer |
| Second Electrode | Second Electrode | Second Electrode |
| Doubling As Driving Electrode | Doubling As Driving Electrode | Doubling As Driving Electrode |
| Liquid Crystal Layer | Liquid Crystal Layer | Liquid Crystal Layer |
| (Longitudinal Electric Field Mode) | (Longitudinal Electric Field Mode) | (Longitudinal Electric Field Mode) |
| First Electrode | First Electrode | First Electrode |
| TFT Layer | TFT Layer | TFT Layer |
|  |  | Second Detection Electrode |
| First Substrate | First Substrate | First Substrate |
| Second Detection Electrode |  |  |
| First Polarizing Plate | First Polarizing Plate | First Polarizing Plate |
|  | Second Detection Electrode |  |
| See FIG. 4 |  |  |

TABLE 1C

| [Case: 1-G] | [Case: 1-H] | [Case: 1-I] |
| --- | --- | --- |
| Second Polarizing Plate | Second Polarizing Plate | Second Polarizing Plate |
| First Detection Electrode | First Detection Electrode | First Detection Electrode |
| Second Substrate | Second Substrate | Second Substrate |

TABLE 1C-continued

Figure 5:
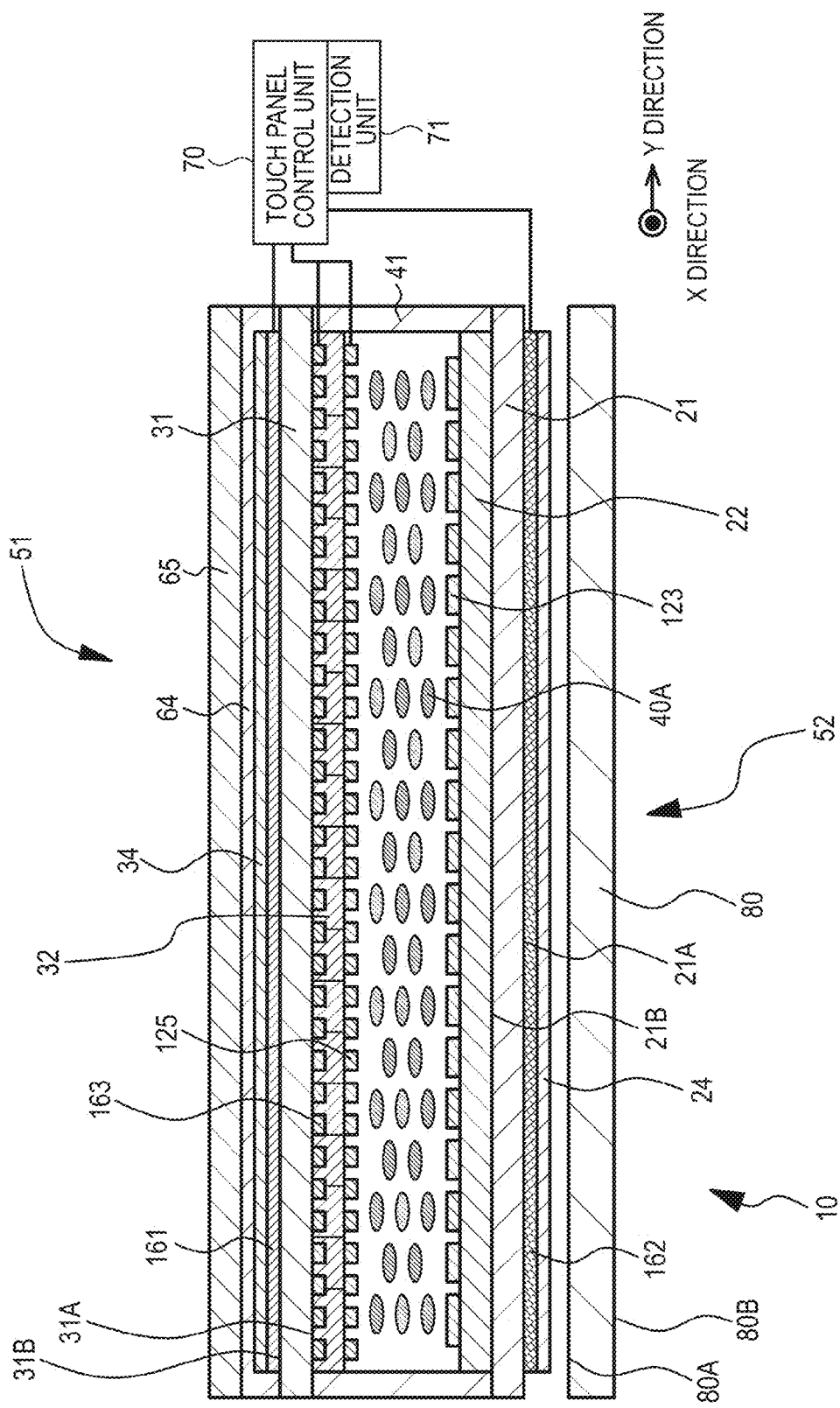
FIG. 5 is a schematic sectional view of an image display device of Example 1 [Case: 1-G].

| [Case: 1-G] | [Case: 1-H] | [Case: 1-I] |
|---|---|---|
| Driving Electrode | Driving Electrode | Driving Electrode |
| Color Filter Layer | Color Filter Layer | Color Filter Layer |
| Second Electrode | Second Electrode | Second Electrode |
| Liquid Crystal Layer | Liquid Crystal Layer | Liquid Crystal Layer |
| (Longitudinal Electric Field Mode) | (Longitudinal Electric Field Mode) | (Longitudinal Electric Field Mode) |
| First Electrode | First Electrode | First Electrode |
| TFT Layer | TFT Layer | TFT Layer |
|  |  | Second Detection Electrode |
| First Substrate | First Substrate | First Substrate |
| Second Detection Electrode |  |  |
| First Polarizing Plate | First Polarizing Plate | First Polarizing Plate |
|  | Second Detection Electrode |  |
| See FIG. 5 |  |  |

TABLE 1D

Figure 6:
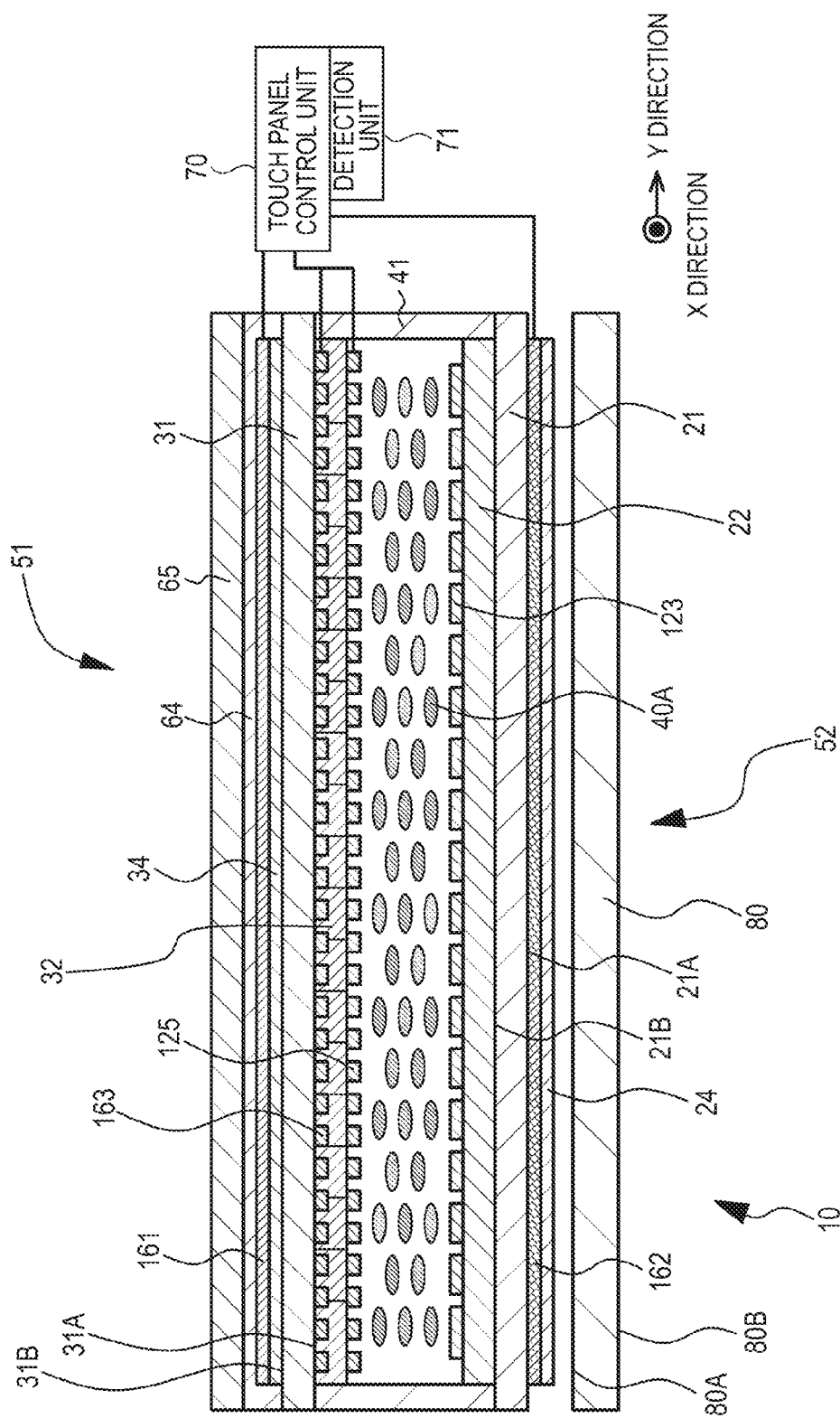
FIG. 6 is a schematic sectional view of an image display device of Example 1 [Case: 1-J].

| [Case: 1-J] | [Case: 1-K] | [Case: 1-L] |
|---|---|---|
| First Detection Electrode | First Detection Electrode | First Detection Electrode |
| Second Polarizing Plate | Second Polarizing Plate | Second Polarizing Plate |
| Second Substrate | Second Substrate | Second Substrate |
| Driving Electrode | Driving Electrode | Driving Electrode |
| Color Filter Layer | Color Filter Layer | Color Filter Layer |
| Second Electrode | Second Electrode | Second Electrode |
| Liquid Crystal Layer | Liquid Crystal Layer | Liquid Crystal Layer |
| (Longitudinal Electric Field Mode) | (Longitudinal Electric Field Mode) | (Longitudinal Electric Field Mode) |
| First Electrode | First Electrode | First Electrode |
| TFT Layer | TFT Layer | TFT Layer |
|  |  | Second Detection Electrode |
| First Substrate | First Substrate | First Substrate |
| Second Detection Electrode |  |  |
| First Polarizing Plate | First Polarizing Plate | First Polarizing Plate |
|  | Second Detection Electrode |  |
| See FIG. 6 |  |  |

In the image display device of Example 1, the first touch panel unit and the second touch panel unit are incorporated in the image display device. Accordingly, it is possible to provide an image display device having touch panel units on both surfaces of the display surface and the back surface without causing an increase in total thickness, a significant increase in weight, and a significant increase in manufacturing costs. The same applies to an image display device of each of Examples 2 to Example 4 described below.

Example 2

Figure 7:
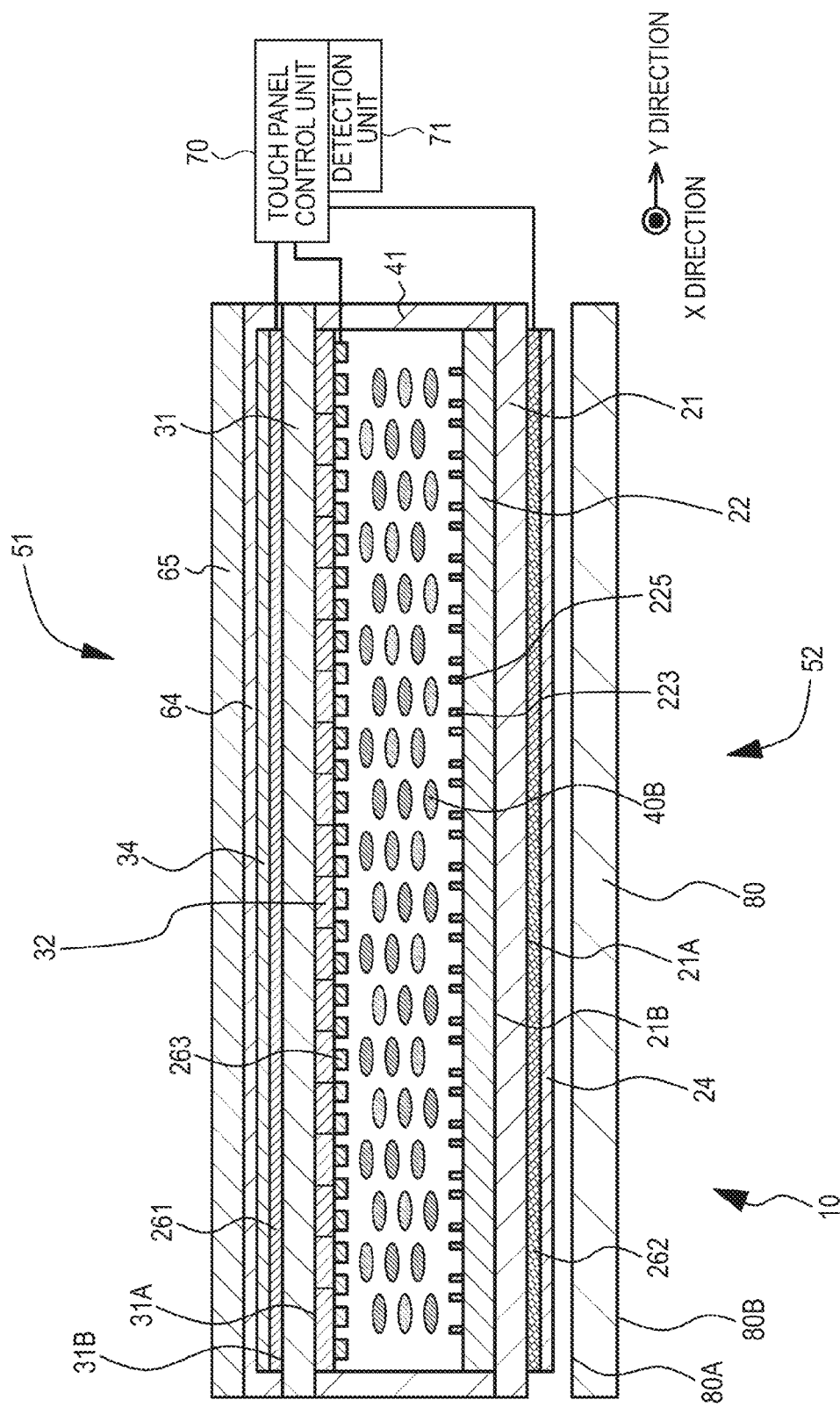
FIG. 7 is a schematic sectional view of an image display device of Example 2 [Case: 2-A].
Figure 26B:
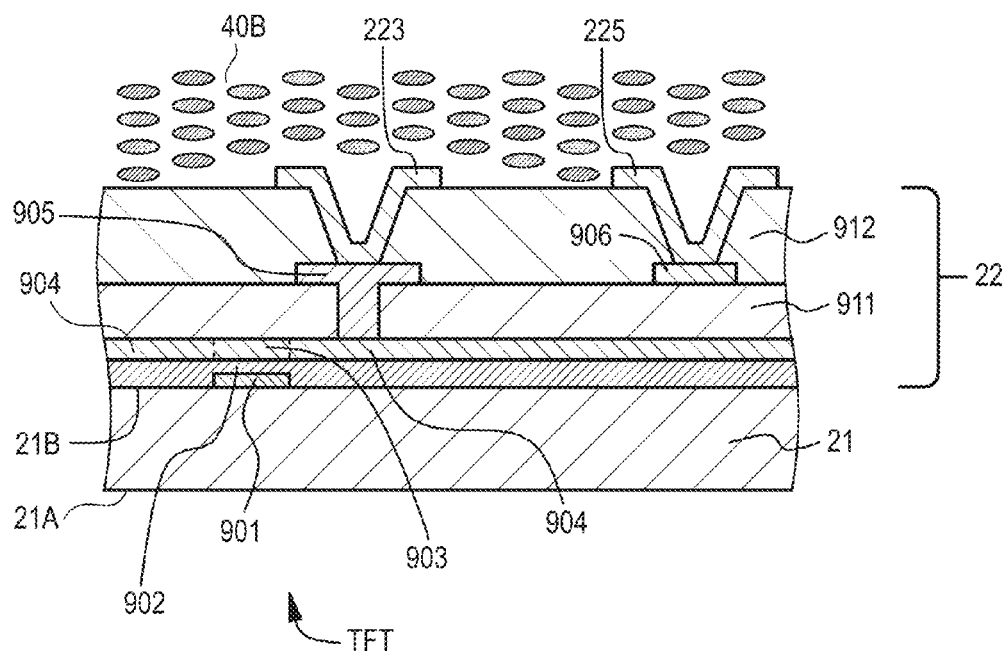
FIG. 26B is a schematic partial sectional view of a liquid crystal cell constituting the image display device of Examples 2 to 4 and 5 to 8.

Example 2 is a modification of Example 1. FIG. 7 is a schematic sectional view of an image display device of Example 2. In Example 2, as liquid crystal which constitutes an image display layer (specifically, a liquid crystal layer) 40B, liquid crystal in a lateral electric field mode, such as FFS (fringe field switching) or IPS (in-plane switching), is used. For this reason, a first electrode 223 and a second electrode 225 are provided on the first substrate. Specifically, as shown in FIG. 26B which is a schematic partial sectional view of a liquid crystal cell, the first electrode 223 and the second electrode 225 are formed on the TFT layer 22 to face the liquid crystal layer 40B, and the first electrode 223 is connected to the TFT through a contact hole 905. The TFT is connected to a driving circuit (not shown) which drives the image display device (not shown). The second electrode 225 is connected to the driving circuit through a wiring 906 formed in the TFT layer 22. While a driving electrode 263 provided on the second substrate is provided between the color filter 32 and the image display layer (specifically, a liquid crystal layer) 40B, unlike Example 1, the driving electrode 263 does not double as a second electrode. That is, the driving electrode 263 and the second electrode 225 are separately controlled. The driving electrode 263 is connected to the touch panel control unit 70, and a pulse driving signal is applied to the driving electrode 263. Alternatively, the driving electrode 263 is provided between the second substrate 31 and the color filter 32. Reference numeral 261 and reference numeral 262 respectively denote a first detection electrode and a second detection electrode. The image display device of Example 2 has the same configuration or structure as the image display device of Example 1 except for this point, thus detailed description will not be repeated.

Figure 8:
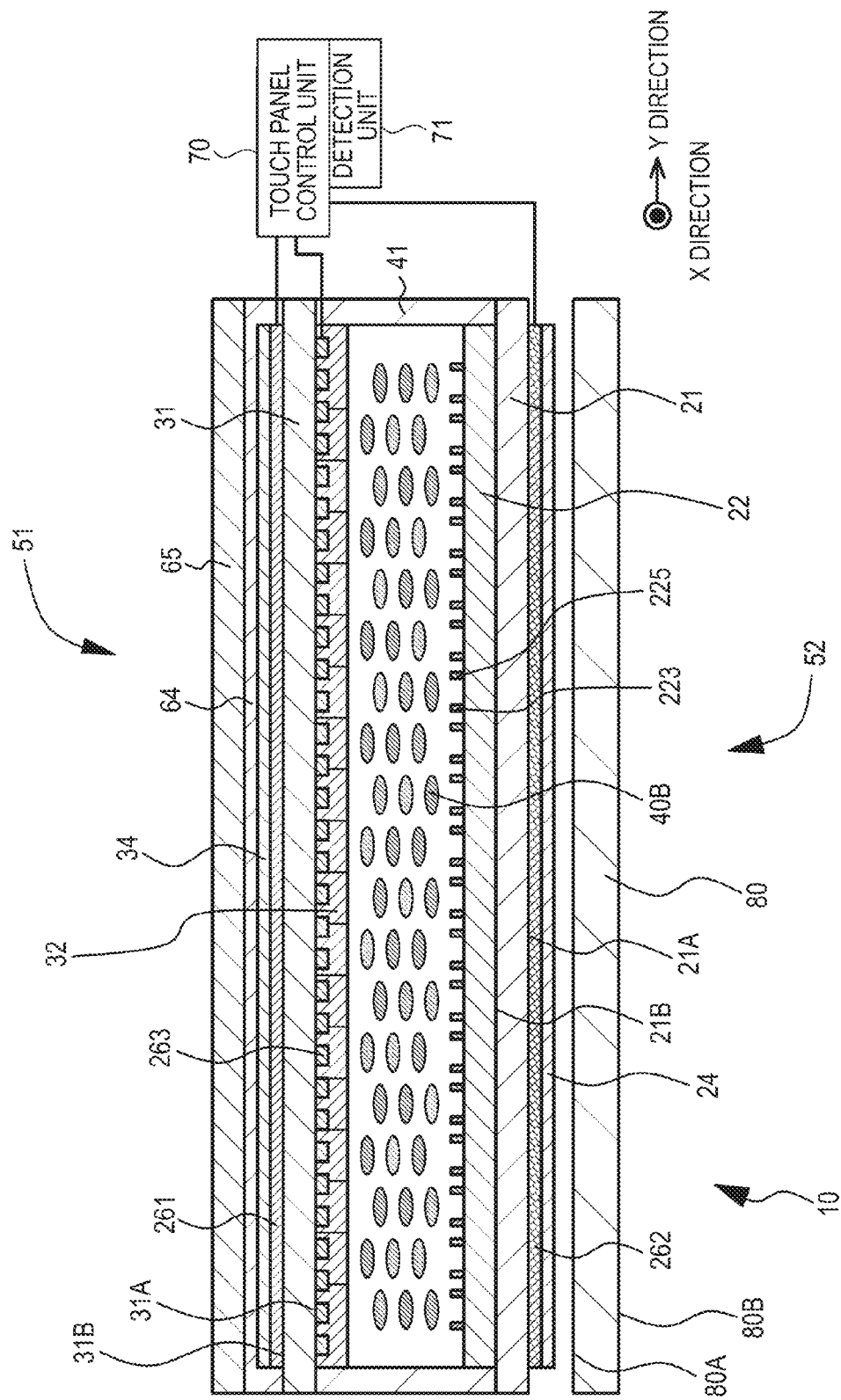
FIG. 8 is a schematic sectional view of an image display device of Example 2 [Case: 2-G].

The layer configuration in the image display device of Example 2 may be modified in various ways. The modifications are shown in Tables 2A to 2D described below, and the layer configuration in the image display device of Example 2 shown in FIG. 7 corresponds to [Case: 2-A]. The schematic sectional view of the image display device in [Case: 2-G] is shown in FIG. 8.

TABLE 2A

| [Case: 2-A] | [Case: 2-B] | [Case: 2-C] |
|---|---|---|
| Second Polarizing Plate | Second Polarizing Plate | Second Polarizing Plate |
| First Detection Electrode | First Detection Electrode | First Detection Electrode |
| Second Substrate | Second Substrate | Second Substrate |
| Color Filter Layer | Color Filter Layer | Color Filter Layer |
| Driving Electrode | Driving Electrode | Driving Electrode |
| Liquid Crystal Layer (Lateral Electric Field Mode) | Liquid Crystal Layer (Lateral Electric Field Mode) | Liquid Crystal Layer (Lateral Electric Field Mode) |
| First Electrode/Second Electrode | First Electrode/Second Electrode | First Electrode/Second Electrode |
| TFT Layer | TFT Layer | TFT Layer |
|  |  | Second Detection Electrode |
| First Substrate | First Substrate | First Substrate |
| Second Detection Electrode |  |  |
| First Polarizing Plate | First Polarizing Plate | First Polarizing Plate |
|  | Second Detection Electrode |  |
| See FIG. 7 |  |  |

TABLE 2B

| [Case: 2-D] | [Case: 2-E] | [Case: 2-F] |
|---|---|---|
| First Detection Electrode | First Detection Electrode | First Detection Electrode |
| Second Polarizing Plate | Second Polarizing Plate | Second Polarizing Plate |
| Second Substrate | Second Substrate | Second Substrate |
| Color Filter Layer | Color Filter Layer | Color Filter Layer |
| Driving Electrode | Driving Electrode | Driving Electrode |
| Liquid Crystal Layer (Lateral Electric Field Mode) | Liquid Crystal Layer (Lateral Electric Field Mode) | Liquid Crystal Layer (Lateral Electric Field Mode) |
| First Electrode/Second Electrode | First Electrode/Second Electrode | First Electrode/Second Electrode |
| TFT Layer | TFT Layer | TFT Layer |
|  |  | Second Detection Electrode |
| First Substrate | First Substrate | First Substrate |
| Second Detection Electrode |  |  |
| First Polarizing Plate | First Polarizing Plate | First Polarizing Plate |
|  | Second Detection Electrode |  |

TABLE 2C

| [Case: 2-G] | [Case: 2-H] | [Case: 2-I] |
|---|---|---|
| Second Polarizing Plate | Second Polarizing Plate | Second Polarizing Plate |
| First Detection Electrode | First Detection Electrode | First Detection Electrode |
| Second Substrate | Second Substrate | Second Substrate |
| Driving Electrode | Driving Electrode | Driving Electrode |
| Color Filter Layer | Color Filter Layer | Color Filter Layer |
| Liquid Crystal Layer (Lateral Electric Field Mode) | Liquid Crystal Layer (Lateral Electric Field Mode) | Liquid Crystal Layer (Lateral Electric Field Mode) |
| First Electrode/Second Electrode | First Electrode/Second Electrode | First Electrode/Second Electrode |
| TFT Layer | TFT Layer | TFT Layer |
|  |  | Second Detection Electrode |
| First Substrate | First Substrate | First Substrate |
| Second Detection Electrode |  |  |
| First Polarizing Plate | First Polarizing Plate | First Polarizing Plate |
|  | Second Detection Electrode |  |
| See FIG. 8 |  |  |

TABLE 2D

[Case: 2-J]

First Detection Electrode
Second Polarizing Plate
Second Substrate
Driving Electrode
Color Filter Layer
Liquid Crystal Layer
(Lateral Electric Field Mode)
First Electrode/Second Electrode
TFT Layer
First Substrate
Second Detection Electrode
First Polarizing Plate

[Case: 2-K]

First Detection Electrode
Second Polarizing Plate
Second Substrate

TABLE 2D-continued

Driving Electrode
Color Filter Layer
Liquid Crystal Layer
(Lateral Electric Field Mode)
First Electrode/Second Electrode
TFT Layer
First Substrate
First Polarizing Plate
Second Detection Electrode

[Case: 2-L]

First Detection Electrode
Second Polarizing Plate
Second Substrate
Driving Electrode
Color Filter Layer
Liquid Crystal Layer
(Lateral Electric Field Mode)
First Electrode/Second Electrode
TFT Layer
Second Detection Electrode
First Substrate
First Polarizing Plate Example 3

Figure 9:
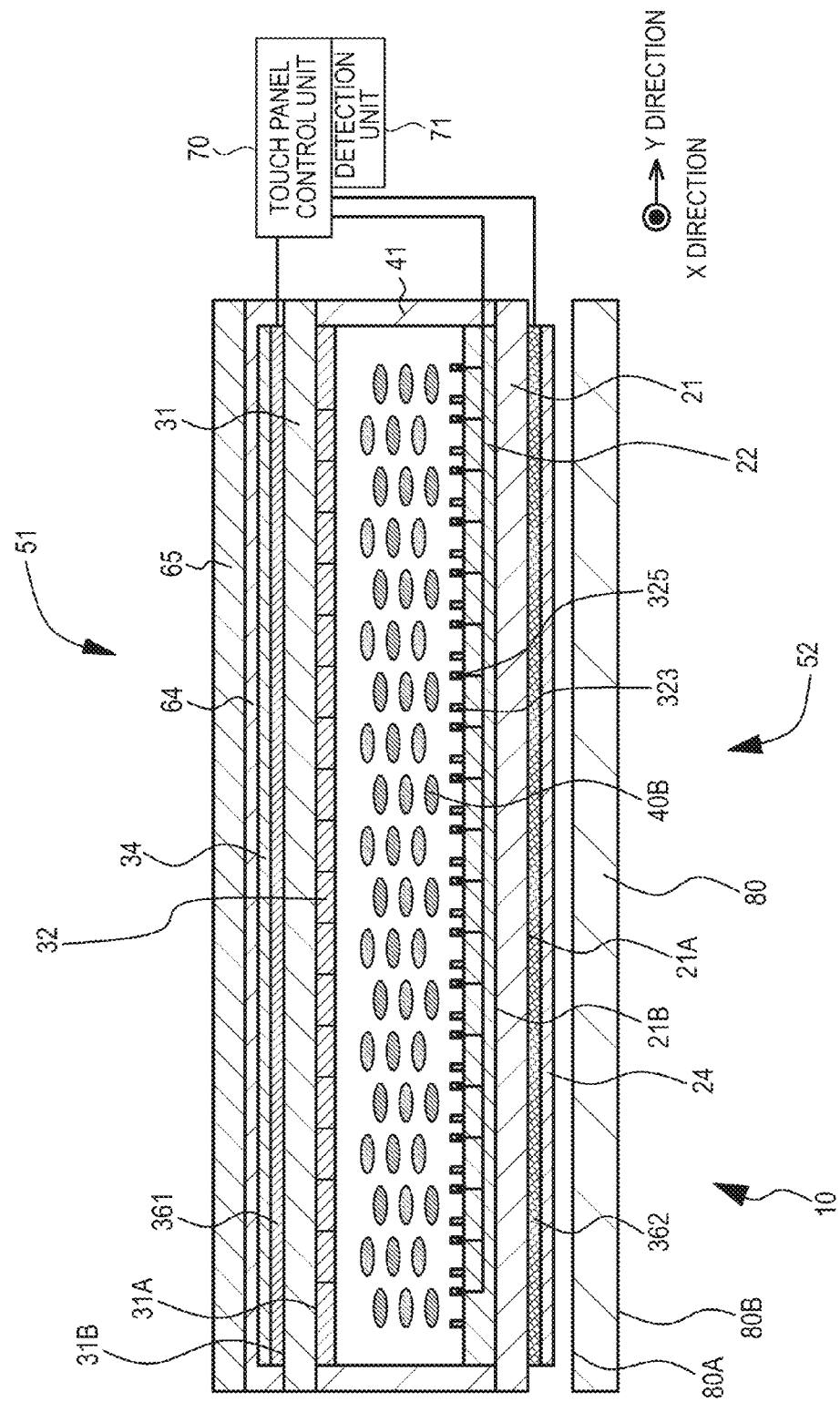
FIG. 9 is a schematic sectional view of an image display device of Example 3 [Case: 3-A].

Example 3 relates to an image display device according to the second embodiment of the present disclosure. FIG. 9 is a schematic sectional view of the image display device of Example 3. In Example 3, a driving electrode is provided on the second surface of the first substrate 21, a plurality of first detection electrodes 361 are provided on the second substrate 31, a second detection electrode 362 is provided on the first surface 21A of the first substrate 21, the first detection electrode 361 and the driving electrode constitute the capacitance-type first touch panel unit 51, and the second detection electrode 362 and the driving electrode constitute the capacitance-type second touch panel unit 52. In Example 3, a plurality of driving electrodes are provided through patterning, and a plurality of second detection electrodes 362 are provided through patterning.

Specifically, a first electrode 323 and a second electrode 325 are formed on the TFT layer 22 to face the liquid crystal layer 40B, and the first electrode 323 is connected to a TFT though a wiring or a contact hole (not shown). The TFT is connected to a driving circuit (not shown) which drives the image display device (not shown). In Example 3, unlike Example 2, instead of providing an independent driving electrode, the second electrode 325 doubles as a driving electrode. The second electrode 325 is connected to the touch panel control unit 70 through a wiring 906 (see FIG. 26B) formed in the TFT layer 22, and the pulse voltage $V_{com}$ is applied to the second electrode 325. The image display device of Example 3 has the same configuration or structure as the image display device of Example 2 except for this point, thus detailed description will not be repeated.

Figure 10:
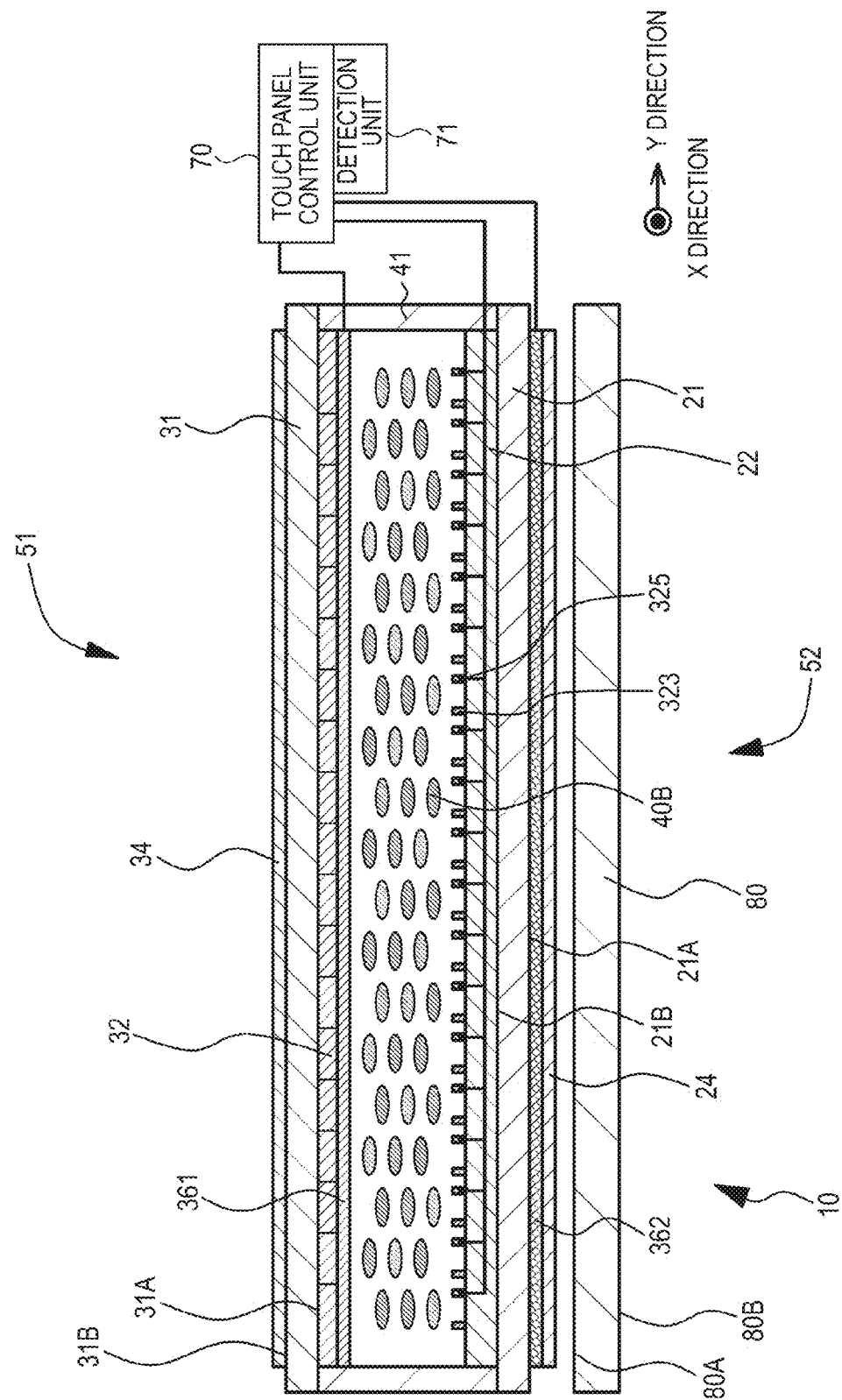
FIG. 10 is a schematic sectional view of an image display device of Example 3 [Case: 3-G].
Figure 11:
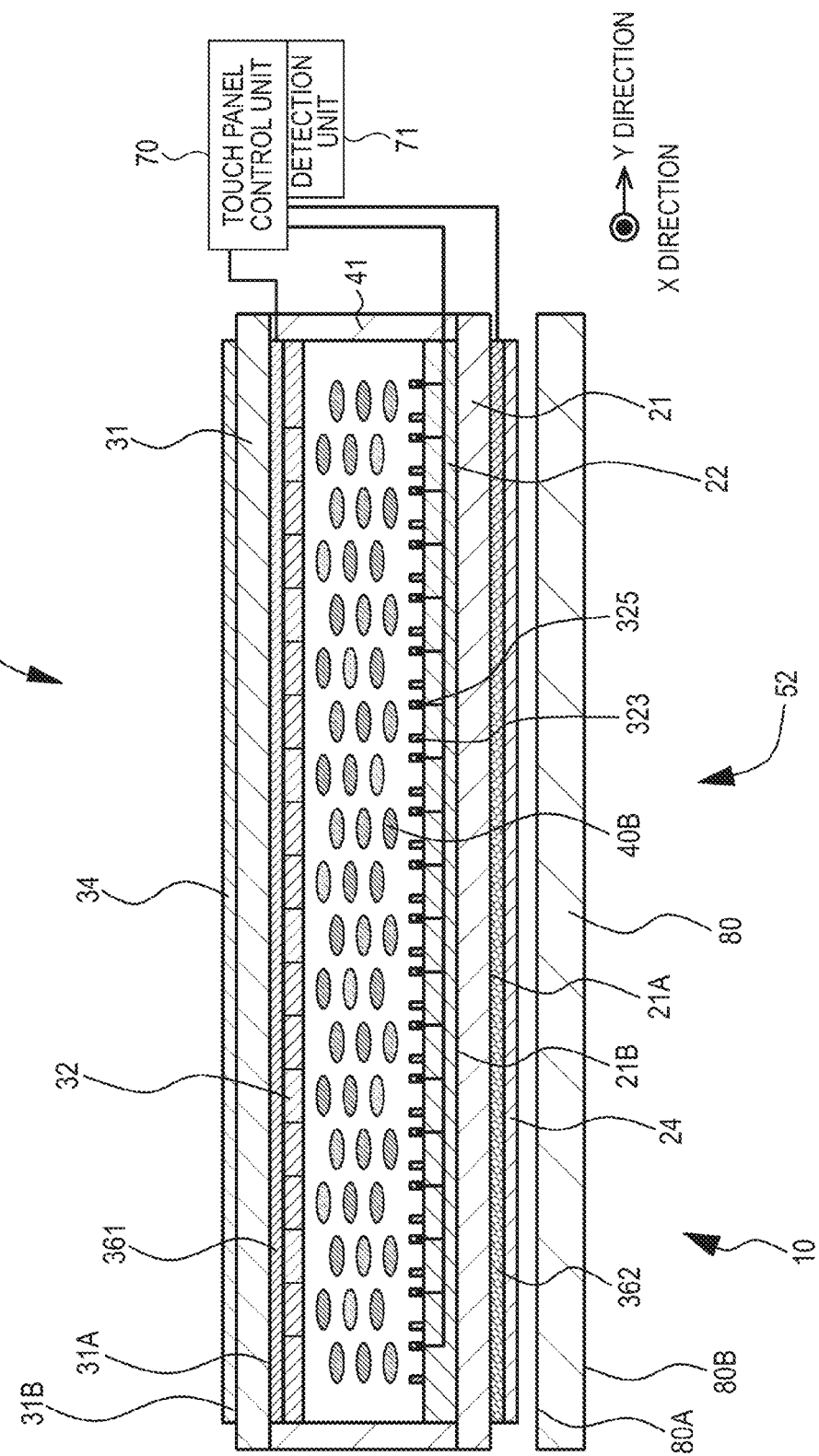
FIG. 11 is a schematic sectional view of an image display device of Example 3 [Case: 3-J].

The layer configuration in the image display device of Example 3 may be modified in various ways. The modifications are shown in Tables 3A to 3D described below, and the layer configuration of the image display device of Example 3 shown in FIG. 9 corresponds to [Case: 3-A]. FIGS. 10 and 11 are schematic sectional views of an image display device in [Case: 3-G] and [Case: 3-J].

TABLE 3A

[Case: 3-A]

Second Polarizing Plate
First Detection Electrode
Second Substrate
Color Filter Layer
Liquid Crystal Layer
(Lateral Electric Field Mode)
First Electrode/Second Electrode
Doubling As Driving Electrode
TFT Layer
First Substrate
Second Detection Electrode
First Polarizing Plate
See FIG. 9

[Case: 3-B]

Second Polarizing Plate
First Detection Electrode
Second Substrate
Color Filter Layer
Liquid Crystal Layer
(Lateral Electric Field Mode)
First Electrode/Second Electrode
Doubling As Driving Electrode
TFT Layer
First Substrate
First Polarizing Plate
Second Detection Electrode

[Case: 3-C]

Second Polarizing Plate
First Detection Electrode
Second Substrate
Color Filter Layer
Liquid Crystal Layer
(Lateral Electric Field Mode)
First Electrode/Second Electrode
Doubling As Driving Electrode
TFT Layer
Second Detection Electrode
First Substrate
First Polarizing Plate

TABLE 3B

[Case: 3-D]

First Detection Electrode
Second Polarizing Plate
Second Substrate
Color Filter Layer
Liquid Crystal Layer
(Lateral Electric Field Mode)
First Electrode/Second Electrode
Doubling As Driving Electrode
TFT Layer
First Substrate
Second Detection Electrode
First Polarizing Plate

[Case: 3-E]

First Detection Electrode
Second Polarizing Plate
Second Substrate
Color Filter Layer
Liquid Crystal Layer
(Lateral Electric Field Mode)
First Electrode/Second Electrode
Doubling As Driving Electrode
TFT Layer
First Substrate
First Polarizing Plate
Second Detection Electrode

TABLE 3B-continued

[Case: 3-F]

First Detection Electrode
Second Polarizing Plate
Second Substrate
Color Filter Layer
Liquid Crystal Layer
(Lateral Electric Field Mode)
First Electrode/Second Electrode
Doubling As Driving Electrode
TFT Layer
Second Detection Electrode
First Substrate
First Polarizing Plate

TABLE 3C

[Case: 3-G]

Second Polarizing Plate
Second Substrate
Color Filter Layer
First Detection Electrode
Liquid Crystal Layer
(Lateral Electric Field Mode)
First Electrode/Second Electrode
Doubling As Driving Electrode
TFT Layer
First Substrate
Second Detection Electrode
First Polarizing Plate
See FIG. 10

[Case: 3-H]

Second Polarizing Plate
Second Substrate
Color Filter Layer
First Detection Electrode
Liquid Crystal Layer
(Lateral Electric Field Mode)
First Electrode/Second Electrode
Doubling As Driving Electrode
TFT Layer
First Substrate
First Polarizing Plate
Second Detection Electrode

[Case: 3-I]

Second Polarizing Plate
Second Substrate
Color Filter Layer
First Detection Electrode
Liquid Crystal Layer
(Lateral Electric Field Mode)
First Electrode/Second Electrode
Doubling As Driving Electrode
TFT Layer
Second Detection Electrode
First Substrate
First Polarizing Plate

TABLE 3D

[Case: 3-J]

Second Polarizing Plate
Second Substrate
First Detection Electrode
Color Filter Layer
Liquid Crystal Layer
(Lateral Electric Field Mode)
First Electrode/Second Electrode
Doubling As Driving Electrode

TABLE 3D-continued

TFT Layer
First Substrate
Second Detection Electrode
First Polarizing Plate
See FIG. 11

[Case: 3-K]

Second Polarizing Plate
Second Substrate
First Detection Electrode
Color Filter Layer
Liquid Crystal Layer
(Lateral Electric Field Mode)
First Electrode/Second Electrode
Doubling As Driving Electrode
TFT Layer
First Substrate
First Polarizing Plate
Second Detection Electrode

[Case: 3-L]

Second Polarizing Plate
Second Substrate
First Detection Electrode
Color Filter Layer
Liquid Crystal Layer
(Lateral Electric Field Mode)
First Electrode/Second Electrode
Doubling As Driving Electrode
TFT Layer
Second Detection Electrode
First Substrate
First Polarizing Plate Example 4

Figure 12:
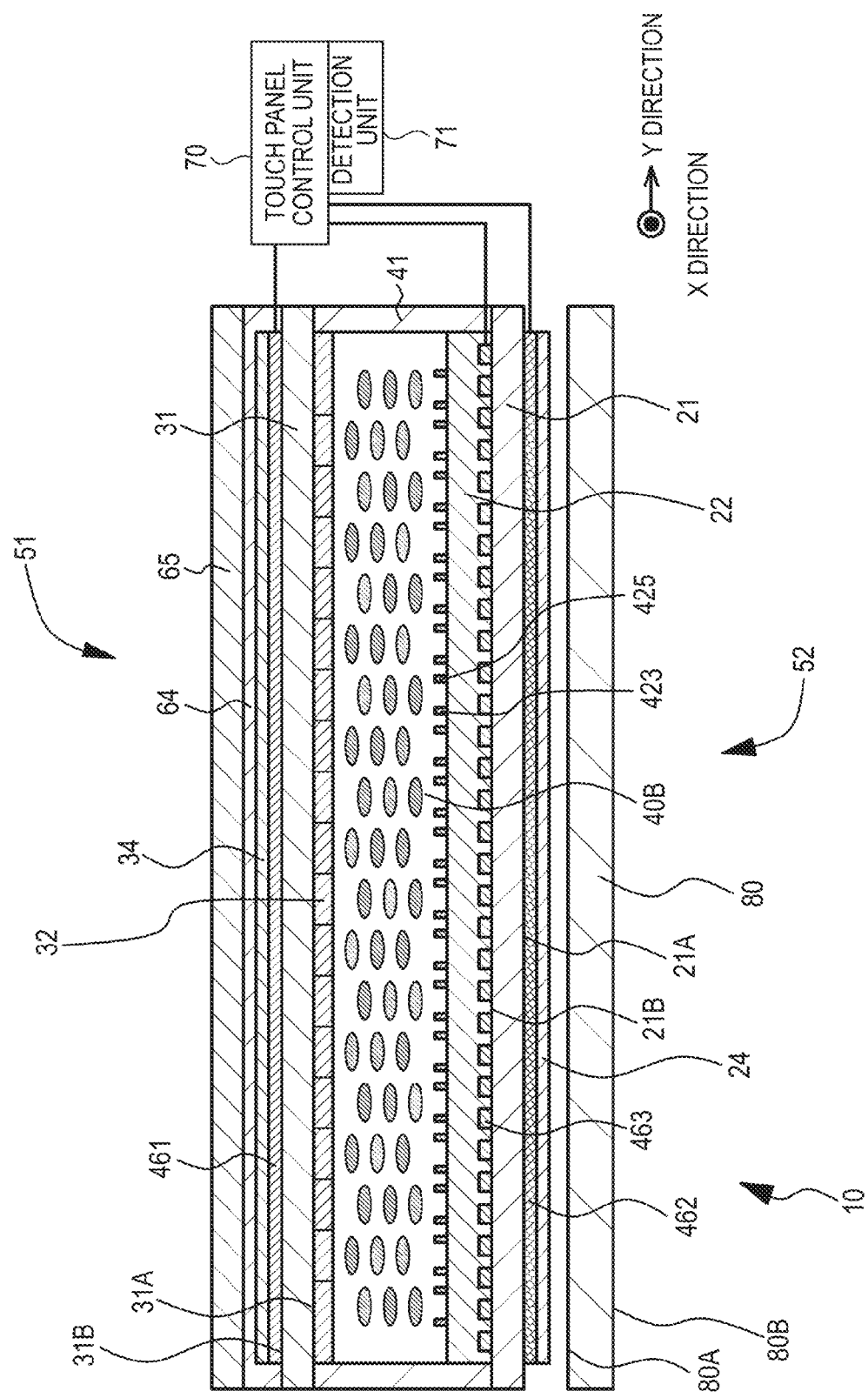
FIG. 12 is a schematic sectional view of an image display device of Example 4 [Case: 4-A].

Example 4 is a modification of Example 3. FIG. 12 is a schematic sectional view of an image display device of Example 4. In Example 4, unlike Example 3, a driving electrode 463 is provided on the first substrate separately from a second electrode 425. Specifically, the driving electrode 463 is provided between the first substrate 21 and the TFT layer 22. The driving electrode 463 is connected to the touch panel control unit 70 through the wiring formed in the TFT layer 22, and the pulse driving signal is applied to the driving electrode 463. The image display device of Example 4 has the same configuration or structure as the image display device of Example 3 except for this point, thus detailed description will not be repeated.

Figure 13:
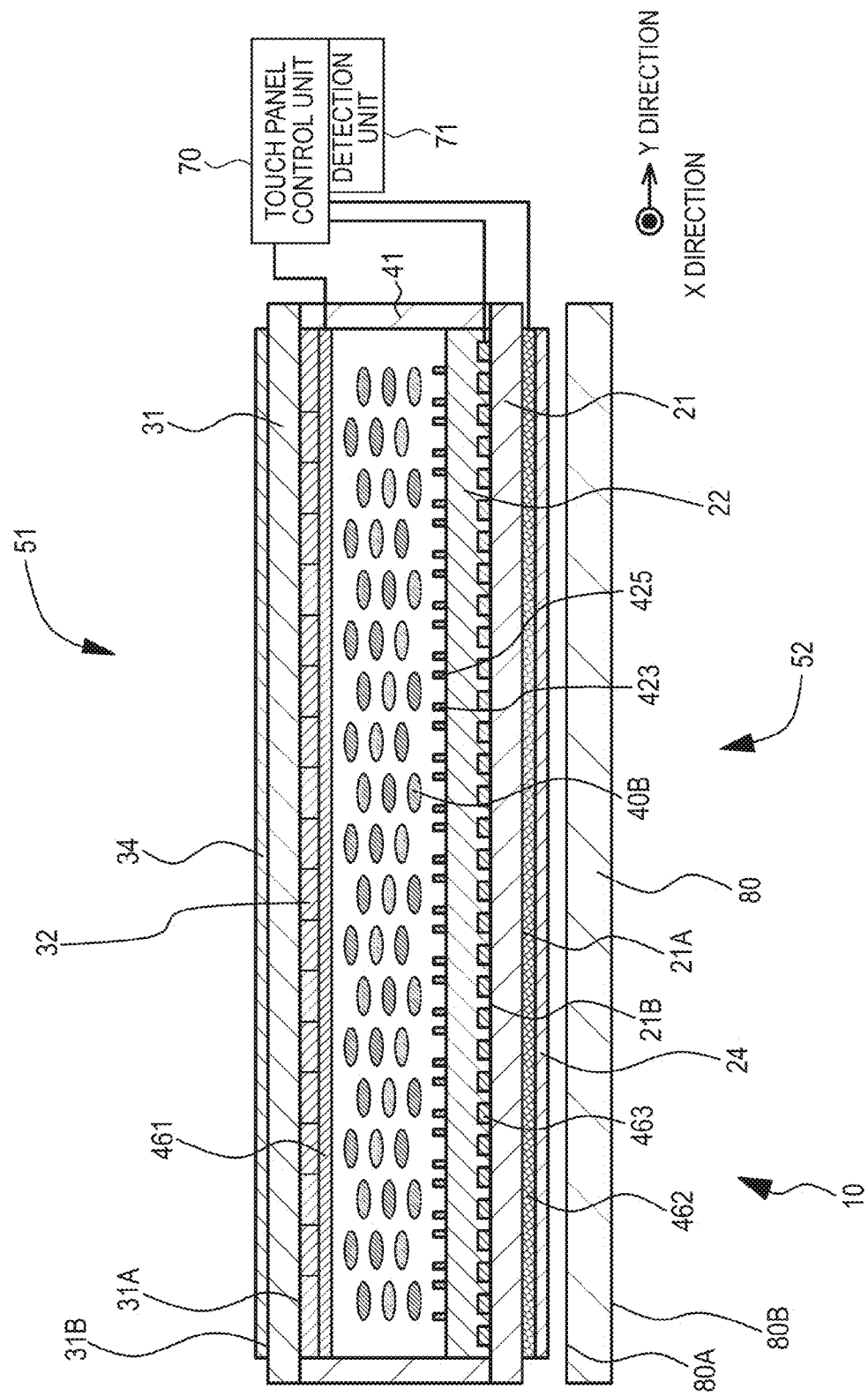
FIG. 13 is a schematic sectional view of an image display device of Example 4 [Case: 4-E].

The layer configuration in the image display device of Example 4 may be modified in various ways. The modifications are shown in Tables 4A and 4B described below, and the layer configuration in the image display device of Example 4 shown in FIG. 12 corresponds to [Case: 4-A]. FIG. 13 is a schematic sectional view of an image display device in [Case: 4-E].

TABLE 4A

[Case: 4-A]

Second Polarizing Plate
First Detection Electrode
Second Substrate
Color Filter Layer
Liquid Crystal Layer
(Lateral Electric Field Mode)
First Electrode/Second Electrode
TFT Layer
Driving Electrode

TABLE 4A-continued

First Substrate
Second Detection Electrode
First Polarizing Plate
See FIG. 12

[Case: 4-B]

Second Polarizing Plate
First Detection Electrode
Second Substrate
Color Filter Layer
Liquid Crystal Layer
(Lateral Electric Field Mode)
First Electrode/Second Electrode
TFT Layer
Driving Electrode
First Substrate
First Polarizing Plate
Second Detection Electrode

[Case: 4-C]

First Detection Electrode
Second Polarizing Plate
Second Substrate
Color Filter Layer
Liquid Crystal Layer
(Lateral Electric Field Mode)
First Electrode/Second Electrode
TFT Layer
Driving Electrode
First Substrate
Second Detection Electrode
First Polarizing Plate

[Case: 4-D]

First Detection Electrode
Second Polarizing Plate
Second Substrate
Color Filter Layer
Liquid Crystal Layer
(Lateral Electric Field Mode)
First Electrode/Second Electrode
TFT Layer
Driving Electrode
First Substrate
First Polarizing Plate
Second Detection Electrode

TABLE 4B

[Case: 4-E]

Second Polarizing Plate
Second Substrate
Color Filter Layer
First Detection Electrode
Liquid Crystal Layer
(Lateral Electric Field Mode)
First Electrode/Second Electrode
TFT Layer
Driving Electrode
First Substrate
Second Detection Electrode
First Polarizing Plate
See FIG. 13

[Case: 4-F]

Second Polarizing Plate
Second Substrate
Color Filter Layer
First Detection Electrode
Liquid Crystal Layer
(Lateral Electric Field Mode)
First Electrode/Second Electrode

TABLE 4B-continued

TFT Layer
Driving Electrode
First Substrate
First Polarizing Plate
Second Detection Electrode

[Case: 4-G]

Second Polarizing Plate
Second Substrate
First Detection Electrode
Color Filter Layer
Liquid Crystal Layer
(Lateral Electric Field Mode)
First Electrode/Second Electrode
TFT Layer
Driving Electrode
First Substrate
Second Detection Electrode
First Polarizing Plate

[Case: 4-H]

Second Polarizing Plate
Second Substrate
First Detection Electrode
Color Filter Layer
Liquid Crystal Layer
(Lateral Electric Field Mode)
First Electrode/Second Electrode
TFT Layer
Driving Electrode
First Substrate
First Polarizing Plate
Second Detection Electrode Example 5

Figure 14:
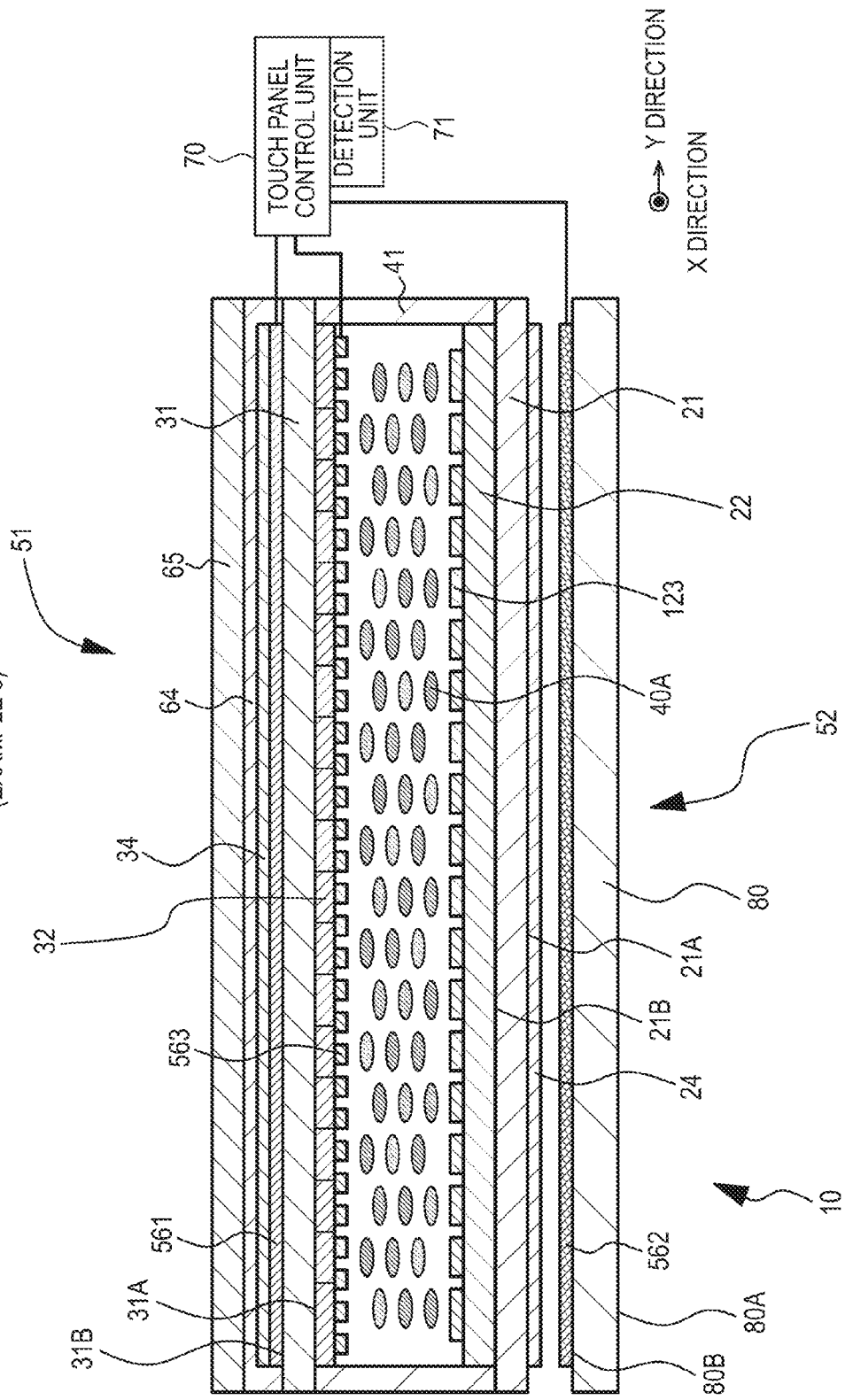
FIG. 14 is a schematic sectional view of an image display device of Example 5 [Case: 5-A].

Example 5 relates to an image display device according to the third embodiment of the present disclosure. As shown in FIG. 14 which is a schematic sectional view, in the image display device 10 of Example 5, a driving electrode 563 is provided on the first surface of the second substrate 31, a plurality of first detection electrodes 561 are provided on the second surface 31B of the second substrate 31, a second detection electrode 562 is provided on the sheet light source device 80, the first detection electrode 561 and the driving electrode 563 constitute the capacitance-type first touch panel unit 51, and the second detection electrode 562 and the driving electrode 563 constitute the capacitance-type second touch panel unit 52. As in Example 1, the driving electrode 563 doubles as an electrode (specifically, a second electrode or a common electrode) which drives the liquid crystal layer 40A. That is, the pulse voltage $V_{com}$ is applied to the driving electrode 563. In Example 5, a plurality of driving electrodes 563 are provided through patterning, and a plurality of second detection electrodes 562 are provided through patterning.

The configurations of the first substrate, the second substrate, and the sheet light source device, and the configurations of the first detection electrode 561 and the driving electrode 563 are substantially the same as the configurations of the first substrate, the second substrate, and the sheet light source device, and the configurations of the first detection electrode 161 and the driving electrode 163 in the image display device of Example 1 except that the arrangement position of the second detection electrode 562 is different, thus detailed description will not be repeated.

The layer configuration in the image display device of Example 5 may be modified in various ways. The modifications are shown in Tables 5A and 5B described below, and the layer configuration in the image display device of Example 5 shown in FIG. 14 corresponds to [Case: 5-A]. Although in [Case: 5-E] to [Case: 5-H], the driving electrode and the second electrode are separately provided, the driving electrode 563 and the second electrode 125 may be at the same potential. FIGS. 15, 16, 17, and 18 are schematic sectional views of an image display device in [Case: 5-B], [Case: 5-C], [Case: 5-D], and [Case: 5-G].

TABLE 5A

[Case: 5-A]

Second Polarizing Plate
First Detection Electrode
Second Substrate
Color Filter Layer
Second Electrode
Doubling As Driving Electrode
Liquid Crystal Layer
(Longitudinal Electric Field Mode)
First Electrode
TFT Layer
First Substrate
First Polarizing Plate
Second Detection Electrode
Light Guide Plate
See FIG. 14

[Case: 5-B]

Figure 15:
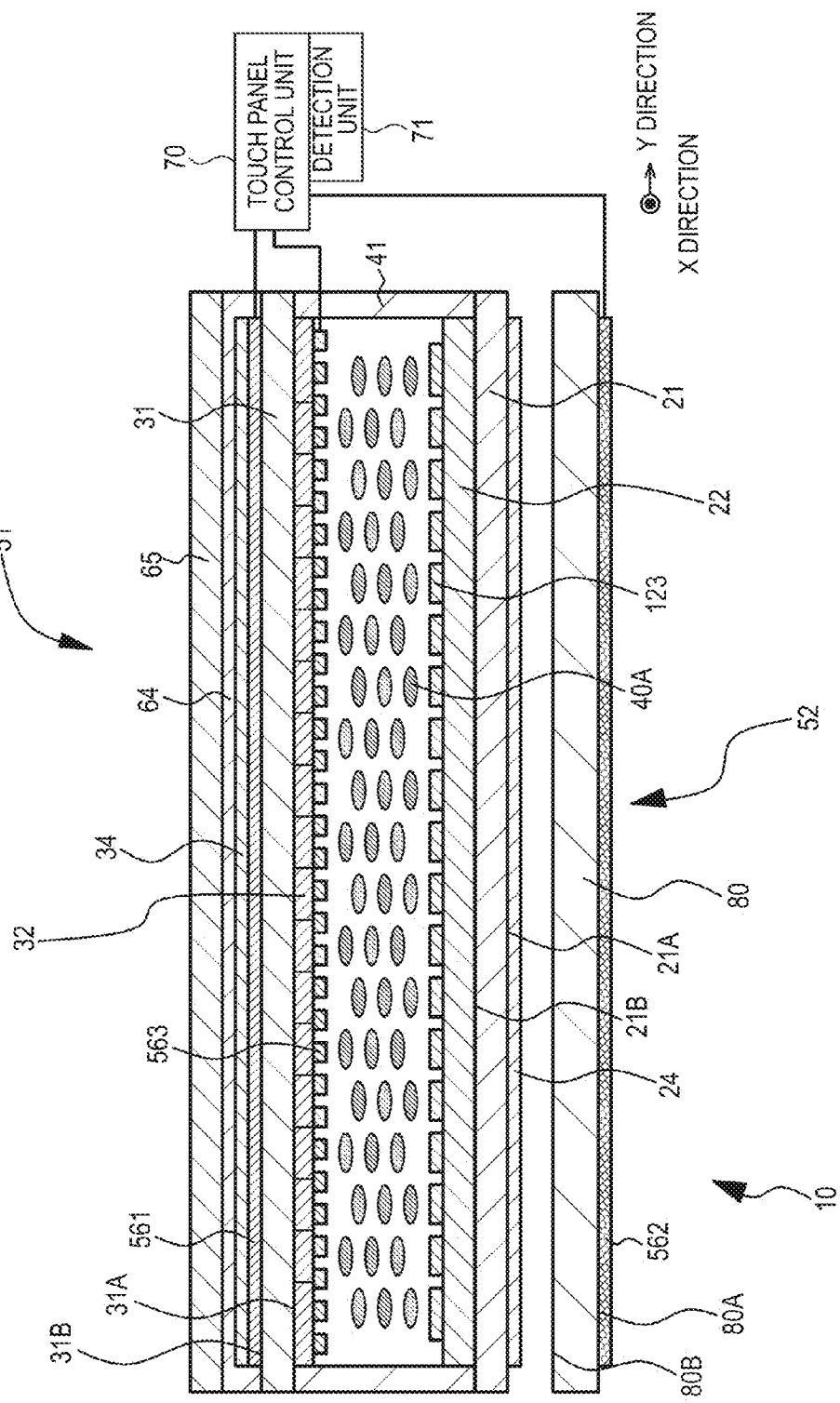
FIG. 15 is a schematic sectional view of an image display device of Example 5 [Case: 5-B].

Second Polarizing Plate
First Detection Electrode
Second Substrate
Color Filter Layer
Second Electrode
Doubling As Driving Electrode
Liquid Crystal Layer
(Longitudinal Electric Field Mode)
First Electrode
TFT Layer
First Substrate
First Polarizing Plate
Light Guide Plate
Second Detection Electrode
See FIG. 15

[Case: 5-C]

Figure 16:
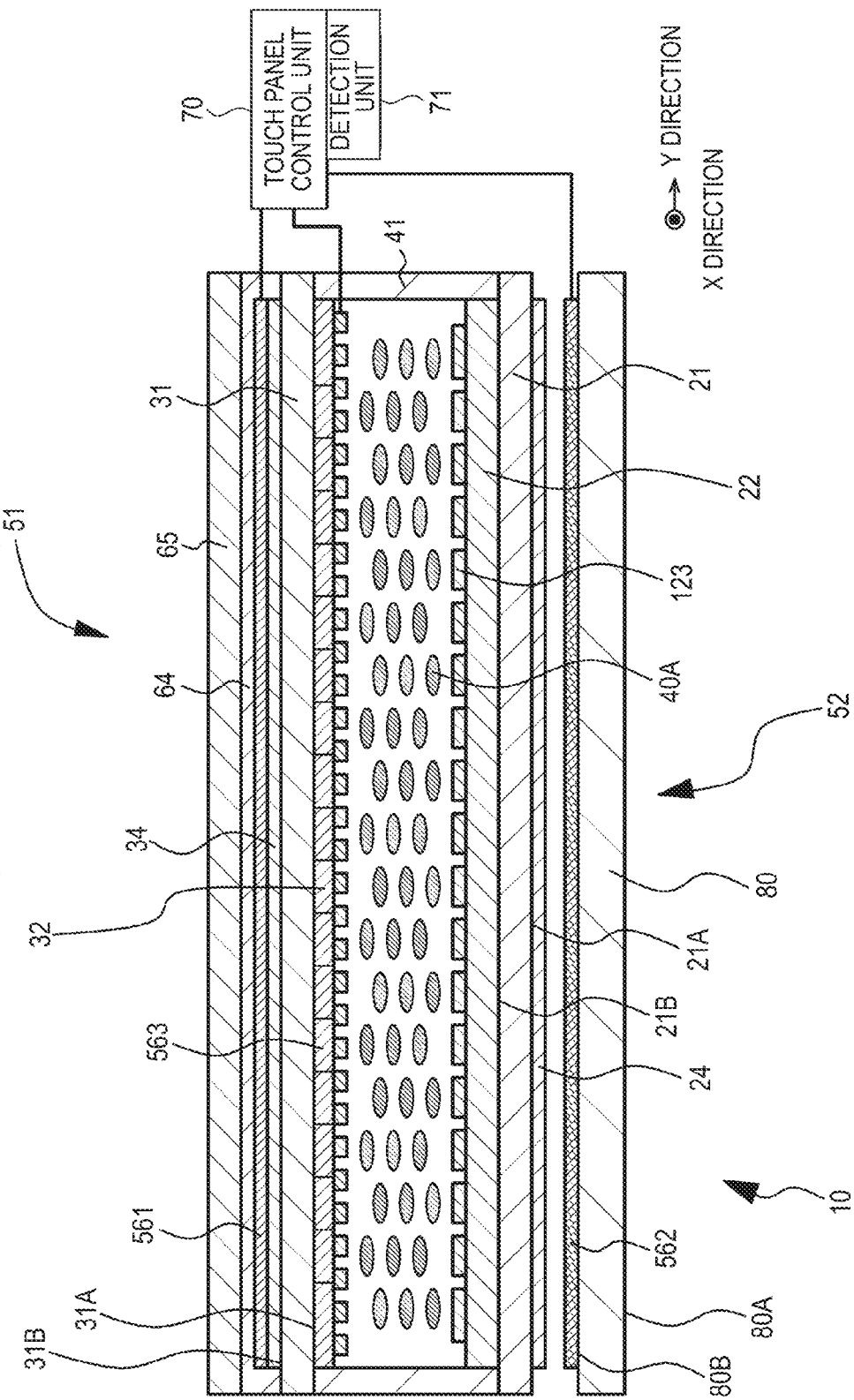
FIG. 16 is a schematic sectional view of an image display device of Example 5 [Case: 5-C].

First Detection Electrode
Second Polarizing Plate
Second Substrate
Color Filter Layer
Second Electrode
Doubling As Driving Electrode
Liquid Crystal Layer
(Longitudinal Electric Field Mode)
First Electrode
TFT Layer
First Substrate
First Polarizing Plate
Second Detection Electrode
Light Guide Plate
See FIG. 16

[Case: 5-D]

First Detection Electrode
Second Polarizing Plate
Second Substrate
Color Filter Layer
Second Electrode
Doubling As Driving Electrode
Liquid Crystal Layer
(Longitudinal Electric Field Mode)
First Electrode
TFT Layer
First Substrate
First Polarizing Plate TABLE 5A-continued Light Guide Plate
Second Detection Electrode

TABLE 5B

[Case: 5-E]

Figure 17:
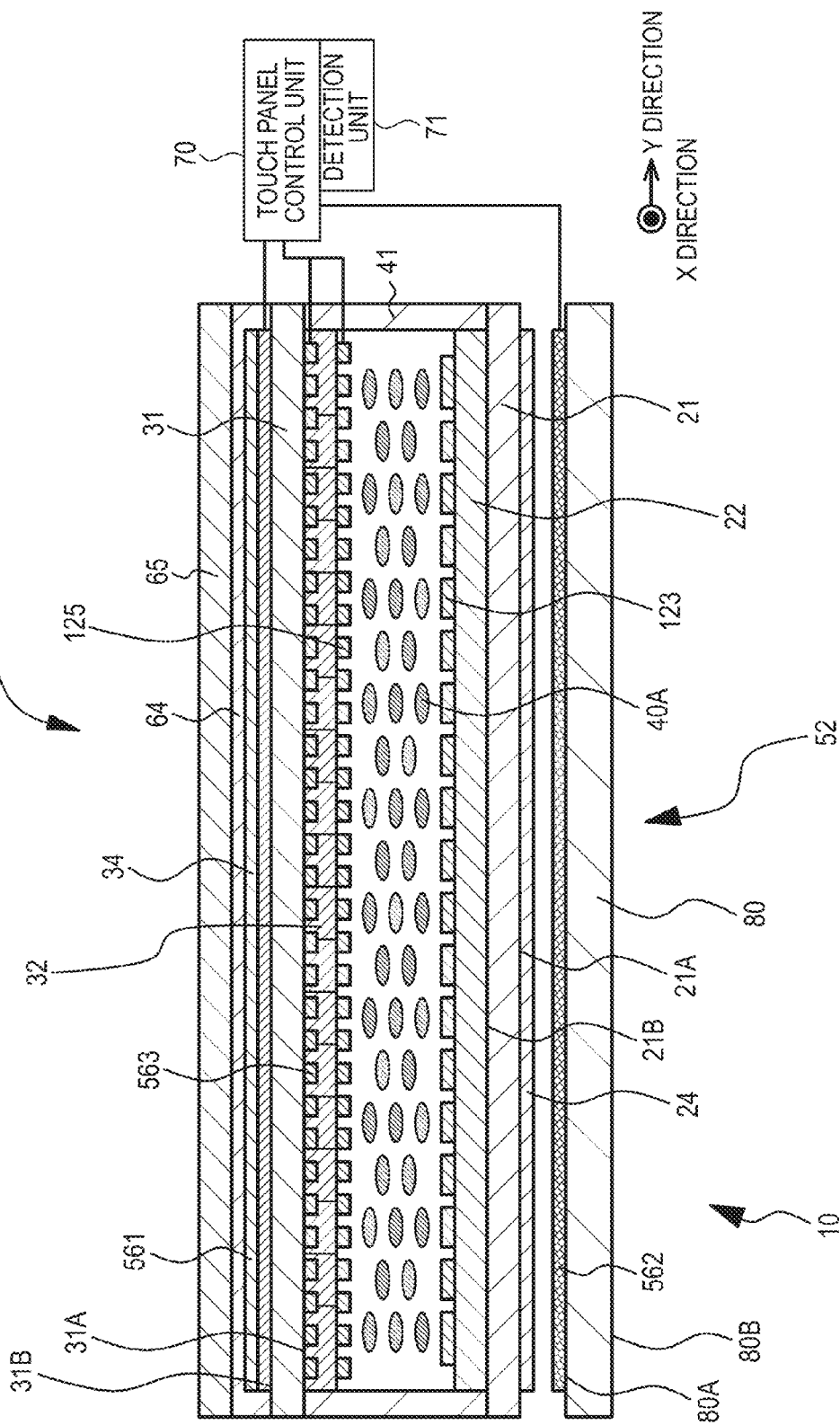
FIG. 17 is a schematic sectional view of an image display device of Example 5 [Case: 5-E].

Second Polarizing Plate
First Detection Electrode
Second Substrate
Driving Electrode
Color Filter Layer
Second Electrode
Liquid Crystal Layer
(Longitudinal Electric Field Mode)
First Electrode
TFT Layer
First Substrate
First Polarizing Plate
Second Detection Electrode
Light Guide Plate
See FIG. 17

[Case: 5-F]

Second Polarizing Plate
First Detection Electrode
Second Substrate
Driving Electrode
Color Filter Layer
Second Electrode
Liquid Crystal Layer
(Longitudinal Electric Field Mode)
First Electrode
TFT Layer
First Substrate
First Polarizing Plate
Light Guide Plate
Second Detection Electrode

[Case: 5-G]

Figure 18:
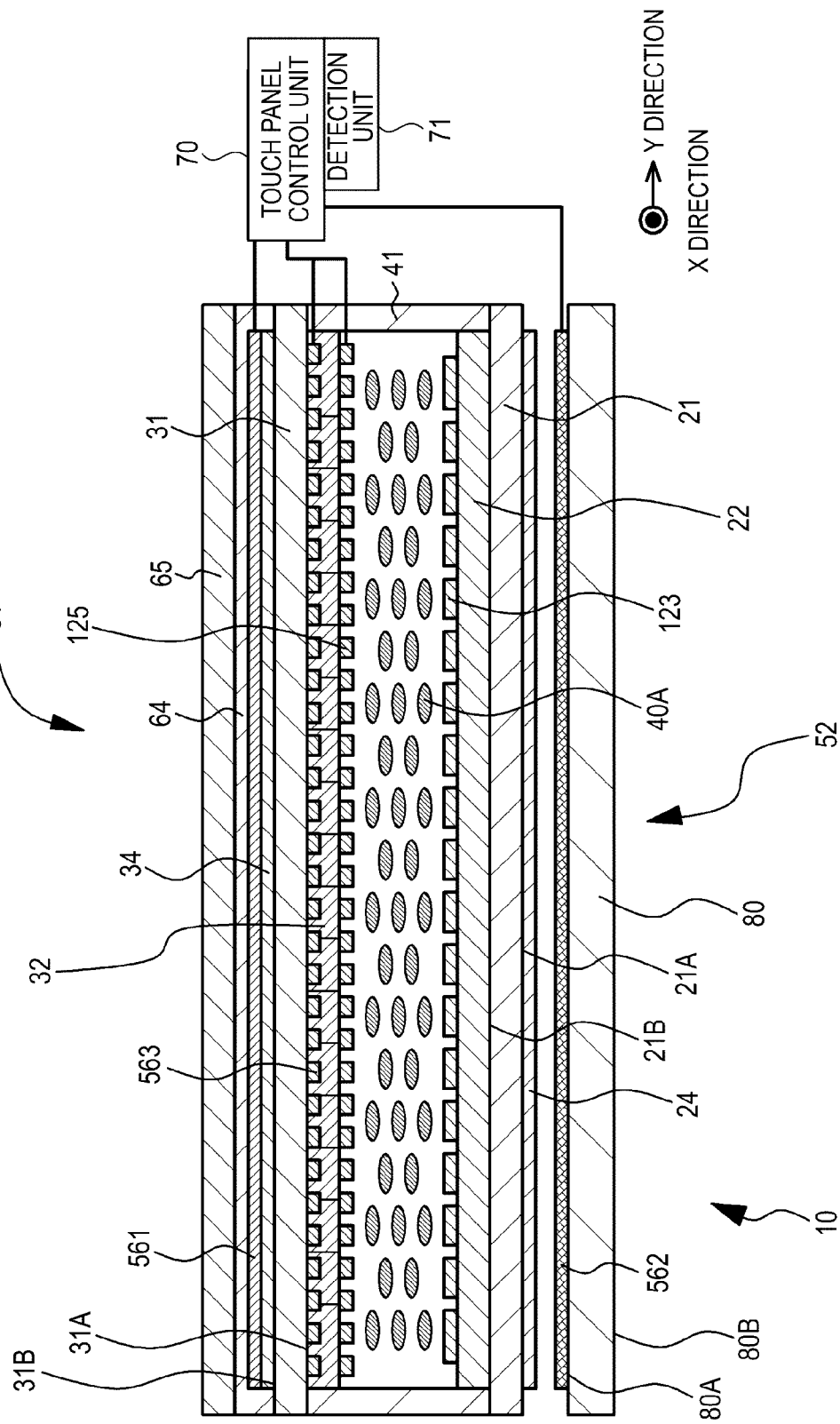
FIG. 18 is a schematic sectional view of an image display device of Example 5 [Case: 5-G].

First Detection Electrode
Second Polarizing Plate
Second Substrate
Driving Electrode
Color Filter Layer
Second Electrode
Liquid Crystal Layer
(Longitudinal Electric Field Mode)
First Electrode
TFT Layer
First Substrate
First Polarizing Plate
Second Detection Electrode
Light Guide Plate
See FIG. 18

[Case: 5-H]

First Detection Electrode
Second Polarizing Plate
Second Substrate
Driving Electrode
Color Filter Layer
Second Electrode
Liquid Crystal Layer
(Longitudinal Electric Field Mode)
First Electrode
TFT Layer
First Substrate
First Polarizing Plate
Light Guide Plate
Second Detection Electrode In the image display device of Example 5, the first touch panel unit and the second touch panel unit are incorporated in the image display device and the sheet light source device.

Therefore, it is possible to provide an image display device having touch panel units on both surfaces of the display surface and the back surface without causing an increase in total thickness, a significant increase in weight, and a significant increase in manufacturing costs. The same applies to an image display device of each of Examples 6 to 8.

Example 6

Figure 19:
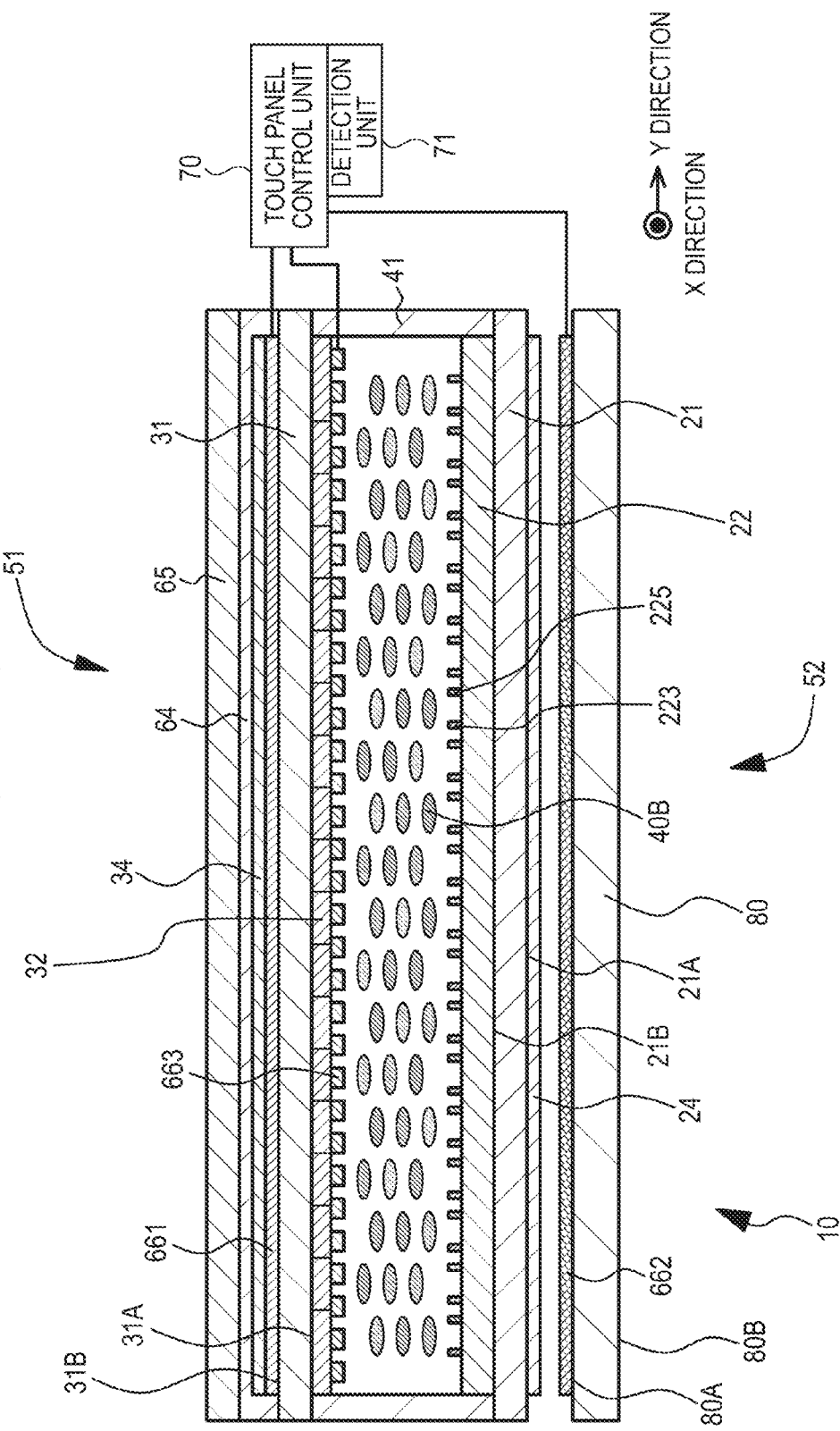
FIG. 19 is a schematic sectional view of an image display device of Example 6 [Case: 6-A].

Example 6 is a modification of Example 5. FIG. 19 is a schematic sectional view of an image display device of Example 6. In Example 6, as in Example 2, as liquid crystal which constitutes the image display layer (specifically, a liquid crystal layer) 40B, liquid crystal in a lateral electric field mode, such as FFS (fringe field switching) or IPS (in-plane switching), is used. For this reason, as in Example 2, the first electrode 223 and the second electrode 225 are provided on the first substrate. While a driving electrode 663 provided on the second substrate is provided between the color filter 32 and the image display layer (specifically, a liquid crystal layer) 40B, unlike Example 5, the driving electrode 663 does not double as the second electrode. Alternatively, the driving electrode 663 is provided between the second substrate 31 and the color filter 32. That is, the driving electrode 663 and the second electrode 225 are separately controlled. Reference numeral 661 and reference numeral 662 respectively denote a first detection electrode and a second detection electrode. The image display device of Example 6 has the same configuration or structure as the image display device of Example 5 except for this point, thus detailed description will not be repeated.

The layer configuration in the image display device of Example 6 may be modified in various ways. The modifications are shown in Tables 6A and 6B described below, and the layer configuration in the image display device of Example 6 shown in FIG. 19 corresponds to [Case: 6-A]. FIG. 20 is a schematic sectional view of an image display device in [Case: 6-E].

TABLE 6A

[Case: 6-A]

Second Polarizing Plate
First Detection Electrode
Second Substrate
Color Filter Layer
Driving Electrode
Liquid Crystal Layer
(Lateral Electric Field Mode)
First Electrode/Second
Electrode
TFT Layer
First Substrate
First Polarizing Plate
Second Detection Electrode
Light Guide Plate
See FIG. 19

[Case: 6-B]

Second Polarizing Plate
First Detection Electrode
Second Substrate
Color Filter Layer
Driving Electrode
Liquid Crystal Layer
(Lateral Electric Field Mode)
First Electrode/Second
Electrode
TFT Layer TABLE 6A-continued First Substrate
First Polarizing Plate
Light Guide Plate
Second Detection Electrode

[Case: 6-C]

First Detection Electrode
Second Polarizing Plate
Second Substrate
Color Filter Layer
Driving Electrode
Liquid Crystal Layer
(Lateral Electric Field Mode)
First Electrode/Second
Electrode
TFT Layer
First Substrate
First Polarizing Plate
Second Detection Electrode
Light Guide Plate

[Case: 6-D]

First Detection Electrode
Second Polarizing Plate
Second Substrate
Color Filter Layer
Driving Electrode
Liquid Crystal Layer
(Lateral Electric Field Mode)
First Electrode/Second
Electrode
TFT Layer
First Substrate
First Polarizing Plate
Light Guide Plate
Second Detection Electrode

TABLE 6B

[Case: 6-E]

Second Polarizing Plate
First Detection Electrode
Second Substrate
Driving Electrode
Color Filter Layer
Liquid Crystal Layer
(Lateral Electric Field Mode)
First Electrode/Second
Electrode
TFT Layer
First Substrate
First Polarizing Plate
Second Detection Electrode
Light Guide Plate
See FIG. 20

[Case: 6-F]

Second Polarizing Plate
First Detection Electrode
Second Substrate
Driving Electrode
Color Filter Layer
Liquid Crystal Layer
(Lateral Electric Field Mode)
First Electrode/Second
Electrode
TFT Layer
First Substrate
First Polarizing Plate TABLE 6B-continued Light Guide Plate
Second Detection Electrode

[Case: 6-G]

First Detection Electrode
Second Polarizing Plate
Second Substrate
Driving Electrode
Color Filter Layer
Liquid Crystal Layer
(Lateral Electric Field Mode)
First Electrode/Second
Electrode
TFT Layer
First Substrate
First Polarizing Plate
Second Detection Electrode
Light Guide Plate

[Case: 6-H]

First Detection Electrode
Second Polarizing Plate
Second Substrate
Driving Electrode
Color Filter Layer
Liquid Crystal Layer
(Lateral Electric Field Mode)
First Electrode/Second
Electrode
TFT Layer
First Substrate
First Polarizing Plate
Light Guide Plate
Second Detection Electrode Example 7

Example 7 relates to an image display device according to the fourth embodiment of the present disclosure. FIG. 21 is a schematic sectional view of the image display device of Example 7. In Example 7, a driving electrode is provided on the second surface of the first substrate 21, a plurality of first detection electrodes 761 are provided on the second substrate 31, a second detection electrode 762 is provided on the sheet light source device 80, the first detection electrode 761 and the driving electrode constitute the capacitance-type first touch panel unit 51, and the second detection electrode 762 and the driving electrode constitute the capacitance-type second touch panel unit 52. In Example 7, a plurality of driving electrodes are provided through patterning, and a plurality of second detection electrodes 762 are provided through patterning.

Specifically, as in Example 3, the first electrode 323 and the second electrode 325 are formed on the TFT layer 22 to face the liquid crystal layer 40B, and the first electrode 323 is connected to the TFT through a wiring or a contact hole (not shown). In Example 7, unlike Example 6, instead of providing an independent driving electrode, the second electrode 325 doubles as a driving electrode. As in Example 3, the second electrode 325 is connected to the touch panel control unit 70. The image display device of Example 7 has the same configuration or structure as the image display device of Example 6 except for this point, thus detailed description will not be repeated.

The layer configuration in the image display device of Example 7 may be modified in various ways. The modifications are shown in Tables 7A and 7B described below, and the layer configuration in the image display device of Example 7 shown in FIG. 21 corresponds to [Case: 7-A].

FIGS. 22 and 23 are schematic sectional views of an image display device in [Case: 7-E] and [Case: 7-G].

TABLE 7A

[Case: 7-A]

Second Polarizing Plate
First Detection Electrode
Second Substrate
Color Filter Layer
Liquid Crystal Layer
(Lateral Electric Field Mode)
First Electrode/Second
Electrode Doubling As
Driving Electrode
TFT Layer
First Substrate
First Polarizing Plate
Second Detection Electrode
Light Guide Plate
See FIG. 21

[Case: 7-B]

Second Polarizing Plate
First Detection Electrode
Second Substrate
Color Filter Layer
Liquid Crystal Layer
(Lateral Electric Field Mode)
First Electrode/Second
Electrode Doubling As
Driving Electrode
TFT Layer
First Substrate
First Polarizing Plate
Light Guide Plate
Second Detection Electrode

[Case: 7-C]

First Detection Electrode
Second Polarizing Plate
Second Substrate
Color Filter Layer
Liquid Crystal Layer
(Lateral Electric Field Mode)
First Electrode/Second
Electrode Doubling As
Driving Electrode
TFT Layer
First Substrate
First Polarizing Plate
Second Detection Electrode
Light Guide Plate

[Case: 7-D]

First Detection Electrode
Second Polarizing Plate
Second Substrate
Color Filter Layer
Liquid Crystal Layer
(Lateral Electric Field Mode)
First Electrode/Second
Electrode Doubling As
Driving Electrode
TFT Layer
First Substrate
First Polarizing Plate
Light Guide Plate
Second Detection Electrode

TABLE 7B

[Case: 7-E]

Second Polarizing Plate
Second Substrate
Color Filter Layer
First Detection Electrode
Liquid Crystal Layer
(Lateral Electric Field Mode)
First Electrode/Second
Electrode Doubling As
Driving Electrode
TFT Layer
First Substrate
First Polarizing Plate
Second Detection Electrode
Light Guide Plate
See FIG. 22

[Case: 7-F]

Second Polarizing Plate
Second Substrate
Color Filter Layer
First Detection Electrode
Liquid Crystal Layer
(Lateral Electric Field Mode)
First Electrode/Second
Electrode Doubling As
Driving Electrode
TFT Layer
First Substrate
First Polarizing Plate
Light Guide Plate
Second Detection Electrode

[Case: 7-G]

Second Polarizing Plate
Second Substrate
First Detection Electrode
Color Filter Layer
Liquid Crystal Layer
(Lateral Electric Field Mode)
First Electrode/Second
Electrode Doubling As
Driving Electrode
TFT Layer
First Substrate
First Polarizing Plate
Second Detection Electrode
Light Guide Plate
See FIG. 23

[Case: 7-H]

Second Polarizing Plate
Second Substrate
First Detection Electrode
Color Filter Layer
Liquid Crystal Layer
(Lateral Electric Field Mode)
First Electrode/Second
Electrode Doubling As
Driving Electrode
TFT Layer
First Substrate
First Polarizing Plate
Light Guide Plate
Second Detection Electrode

Example 8

Example 8 is a modification of Example 7. FIG. 24 is a schematic sectional view of an image display device of Example 8. In Example 8, unlike Example 7, a driving electrode 863 is provided on the first substrate separately from the second electrode 425. Specifically, the driving electrode 863 is provided between the first substrate 21 and the TFT layer 22. The image display device of Example 8 has the same configuration or structure as the image display device of Example 7 except for this point, thus detailed description will not be repeated.

The layer configuration in the image display device of Example 8 may be modified in various ways. The modifications are shown in Tables 8A and 8B described below, and the layer configuration in the image display device of Example 8 shown in FIG. 24 corresponds to [Case: 8-A]. FIG. 25 is a schematic sectional view of an image display device in [Case: 8-E].

TABLE 8A

[Case: 8-A]

Second Polarizing Plate
First Detection Electrode
Second Substrate
Color Filter Layer
Liquid Crystal Layer
(Lateral Electric Field Mode)
First Electrode/Second Electrode
TFT Layer
Driving Electrode
First Substrate
First Polarizing Plate
Light Guide Plate
Second Detection Electrode
See FIG. 24

[Case: 8-B]

Second Polarizing Plate
First Detection Electrode
Second Substrate
Color Filter Layer
Liquid Crystal Layer
(Lateral Electric Field Mode)
First Electrode/Second Electrode
TFT Layer
Driving Electrode
First Substrate
First Polarizing Plate
Light Guide Plate
Second Detection Electrode

[Case: 8-C]

First Detection Electrode
Second Polarizing Plate
Second Substrate
Color Filter Layer
Liquid Crystal Layer
(Lateral Electric Field Mode)
First Electrode/Second Electrode
TFT Layer
Driving Electrode
First Substrate
First Polarizing Plate
Second Detection Electrode
Light Guide Plate

[Case: 8-D]

First Detection Electrode
Second Polarizing Plate
Second Substrate
Color Filter Layer
Liquid Crystal Layer
(Lateral Electric Field Mode)
First Electrode/Second Electrode
TFT Layer
Driving Electrode
First Substrate
First Polarizing Plate
Light Guide Plate
Second Detection Electrode

TABLE 8B

[Case: 8-E]

Second Polarizing Plate
Second Substrate
Color Filter Layer
First Detection Electrode
Liquid Crystal Layer
(Lateral Electric Field Mode)
First Electrode/Second Electrode
TFT Layer
Driving Electrode
First Substrate
First Polarizing Plate
Second Detection Electrode
Light Guide Plate
See FIG. 25

[Case: 8-F]

Second Polarizing Plate
Second Substrate
Color Filter Layer
First Detection Electrode
Liquid Crystal Layer
(Lateral Electric Field Mode)
First Electrode/Second Electrode
TFT Layer
Driving Electrode
First Substrate
First Polarizing Plate
Light Guide Plate
Second Detection Electrode

[Case: 8-G]

Second Polarizing Plate
Second Substrate
First Detection Electrode
Color Filter Layer
Liquid Crystal Layer
(Lateral Electric Field Mode)
First Electrode/Second Electrode
TFT Layer
Driving Electrode
First Substrate
First Polarizing Plate
Second Detection Electrode
Light Guide Plate

[Case: 8-H]

Second Polarizing Plate
Second Substrate
First Detection Electrode
Color Filter Layer
Liquid Crystal Layer
(Lateral Electric Field Mode)
First Electrode/Second Electrode
TFT Layer
Driving Electrode
First Substrate
First Polarizing Plate
Light Guide Plate
Second Detection Electrode Example 9

In Example 9, the detection unit (detection circuit) 71 will be described. Although the following description will be provided illustrating the image display device of Example 1, the detection unit of Example 9 may be of course applied to the image display device described in each of Examples 2 to 8.

Figure 28:
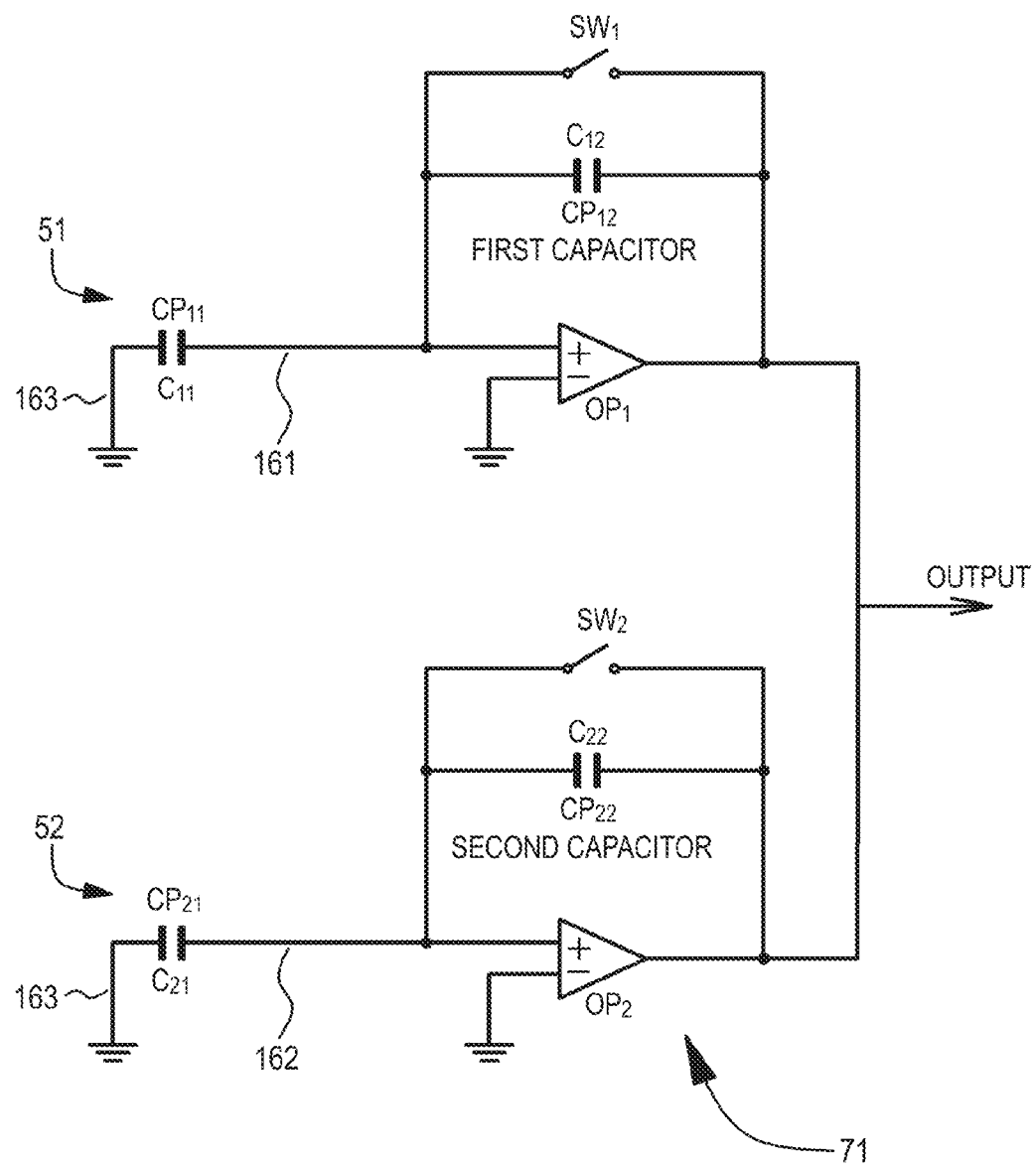
FIG. 28 is a circuit diagram of a detection unit constituting a touch panel control unit.

As shown in FIG. 1 and as shown in a circuit diagram of FIG. 28, the first detection electrode 161, the second detection electrode 162, and the driving electrode 163 are connected to the detection unit 71. The detection unit 71 includes a first capacitor $CP_{12}$ (capacitance: $C_{12}$) connected in series to a first capacitive unit $CP_{11}$ (capacitance: $C_{11}$) constituted by the first detection electrode 161 and the driving electrode 163, and a second capacitor $CP_{22}$ (capacitance: $C_{22}$) connected in series to a second capacitive unit $CP_{21}$ (capacitance: $C_{21}$) constituted by the second detection electrode 162 and the driving electrode 163. The detection unit 71 further includes a first operational amplifier $OP_1$ connected in parallel to the first capacitor $CP_{12}$, and a second operational amplifier $OP_2$ connected in parallel to the second capacitor $CP_{22}$. The detection unit 71 further includes a reset switch circuit $SW_1$ connected in parallel to the first capacitor $CP_{12}$, and a reset switch circuit $SW_2$ connected in parallel to the second capacitor $CP_{22}$. If the reset switch circuits $SW_1$ and $SW_2$ are placed in the on state, the first capacitor $CP_{12}$ and the second capacitor $CP_{22}$ are discharged, thereby performing a type of initialization.

Hereinafter, the operation of the detection unit 71 will be described. The reset switch circuits $SW_1$ and $SW_2$ are placed in the on state every time before the operation starts to discharge the first capacitor $CP_{12}$ and the second capacitor $CP_{22}$. During the operation of the detection unit 71, the switch circuits $SW_1$ and $SW_2$ are in the off state. It is assumed that the pulse voltage $V_{com}$ is applied to the driving electrode 163.

Since the capacitance of the first capacitive unit $CP_{11}$ is $C_{11}$, and the capacitance of the first capacitor $CP_{12}$ is $C_{12}$, a detection voltage $V_1$ is obtained with the following expression.

$$V_1 = V_{com} \cdot (C_{11}/C_{12})$$

If the capacitance of the first capacitive unit $CP_{11}$ when it is detected that the finger of the user touches is $C_{11}'$, a detection voltage $V_1'$ is obtained with the following expression.

$$V_1' = V_{com} \cdot (C_{11}'/C_{12})$$

Since the relationship $C_{11}' < C_{11}$ is established, the following relationship is established.

$$V_1' < V_1$$

Similarly, since the capacitance of the second capacitive unit $CP_{21}$ is $C_{21}$, and the capacitance of the second capacitor $CP_{22}$ is $C_{22}$, a detection voltage $V_2$ is obtained with the following expression.

$$V_2 = V_{com} \cdot (C_{21}/C_{22})$$

If the capacitance of the second capacitive unit $CP_{21}$ when it is detected that the finger of the user touches is $C_{21}'$, a detection voltage $V_2'$ is obtained with the following expression.

$$V_2' = V_{com} \cdot (C_{21}'/C_{22})$$

Since the relationship $C_{21}' < C_{21}$ is established, the following relationship is established.

$$V_2' < V_2$$

The outputs $V_1'$ and $V_2'$ of the detection unit 71 pass through an AD conversion circuit provided in the touch panel control unit 70 or various filters for removing noise, and are finally detected as the finger of the user touching the first touch panel unit 51 and the second touch panel unit 52.

Figure 29A:
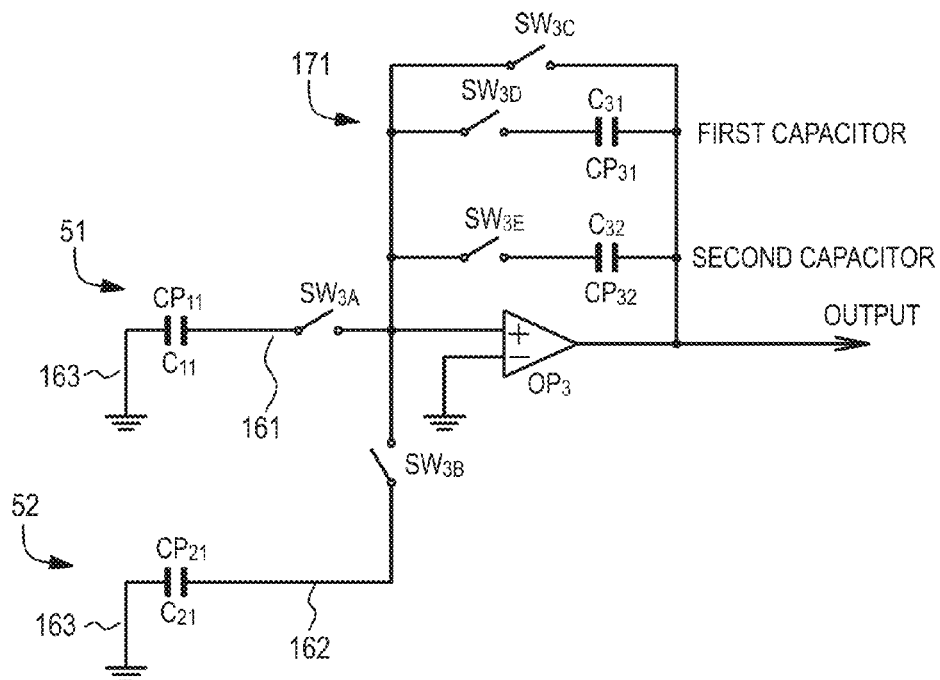
FIGS. 29A and 29B are circuit diagrams of a different detection unit constituting a touch panel control unit.

FIG. 29A is a circuit diagram of a modification of a detection unit. A detection unit (detection circuit) 171 includes a variable-capacitance capacitor connected in series to the first capacitive unit $CP_{11}$ (capacitance: $C_{11}$) constituted by the first detection electrode 161 and the driving electrode 163 and the second capacitive unit $CP_{21}$ (capacitance: $C_{21}$) constituted by the second detection electrode 162 and the driving electrode 163. The capacitance of the capacitor changes between during the detection of the first touch panel unit 51 and during the detection of the second touch panel unit 52. The detection unit 171 further includes an operational amplifier $OP_3$ connected in parallel to the capacitor. Specifically, the capacitor has a first capacitor $CP_{31}$ (capacitance: $C_{31}$) and a second capacitor $CP_{32}$ (capacitance: $C_{32}$) connected in parallel to the operational amplifier $OP_3$. A first selection switch circuit $SW_{3D}$ is provided between the operational amplifier $OP_3$ and the first capacitor $CP_{31}$, and a second selection switch circuit $SW_{3E}$ is provided between the operational amplifier $OP_3$ and the second capacitor $CP_{32}$. A reset switch circuit $SW_{3C}$ is further provided in parallel to the first capacitor $CP_{31}$ and the second capacitor $CP_{32}$. A first switch unit $SW_{3A}$ is provided on the output side of the first touch panel unit 51, and a second switch unit $SW_{3B}$ is provided on the output side of the second touch panel unit 52.

Hereinafter, the operation of the detection unit 171 will be described. The reset switch circuit $SW_{3C}$ is placed in the on state every time before the operation starts to discharge the first capacitor $CP_{31}$ and the second capacitor $CP_{32}$. During the operation of the detection unit 171, the switch circuit $SW_{3C}$ is in the off state. It is assumed that the pulse voltage $V_{com}$ is applied to the driving electrode 163.

During the detection of the first touch panel unit 51, the first switch unit $SW_{3A}$ and the first selection switch circuit $SW_{3D}$ are placed in the on state, and the second switch unit $SW_{3B}$ and the second selection switch circuit $SW_{3E}$ are placed in the off state. Accordingly, similarly to the detection unit 71, the following expression is obtained.

$$V_1' = V_{com} \cdot (C_{11}'/C_{31})$$

During the detection of the second touch panel unit 52, the second switch unit $SW_{3B}$ and the second selection switch circuit $SW_{3E}$ are placed in the on state, and the first switch unit $SW_{3A}$ and the first selection switch circuit $SW_{3D}$ are placed in the off state. Accordingly, similarly to the detection unit 71, the following expression is obtained.

$$V_2' = V_{com} \cdot (C_{21}'/C_{32})$$

The outputs $V_1'$ and $V_2'$ of the detection unit 171 pass through an AD conversion circuit provided in the touch panel control unit 70 or various filters for removing noise, and are finally detected as the finger of the user touching the first touch panel unit 51 and the second touch panel unit 52.

Figure 29B:
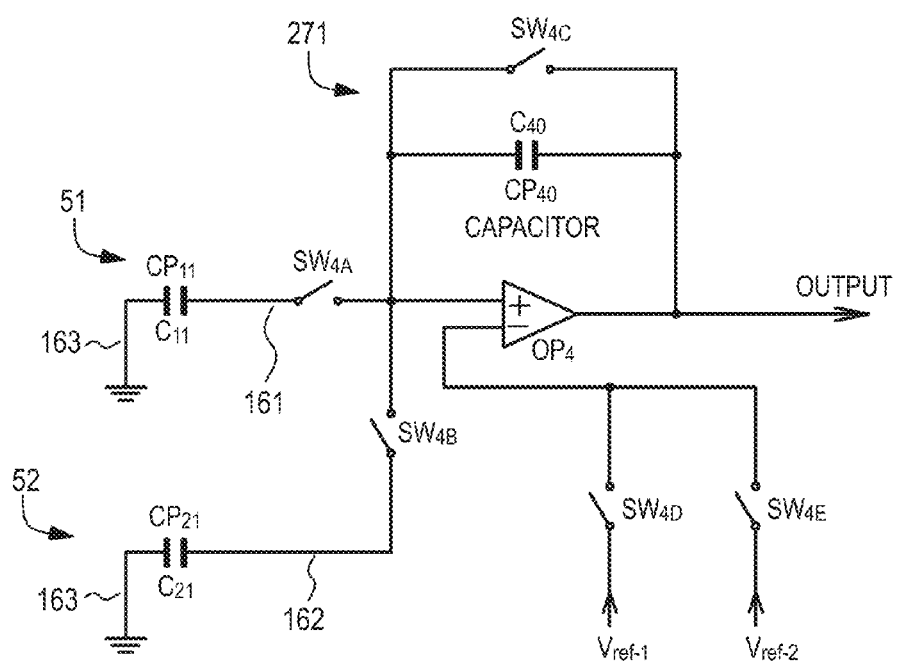

FIG. 29B is a circuit diagram of another modification of a detection unit. A detection unit (detection circuit) 271 includes a capacitor $CP_{40}$ (capacitance: $C_{40}$) connected in series to the first capacitive unit $CP_{11}$ (capacitance: $C_{11}$) constituted by the first detection electrode 161 and the driving electrode 163 and the second capacitive unit $CP_{21}$ (capacitance: $C_{21}$) constituted by the second detection electrode 162 and the driving electrode 163. The detection unit 271 further includes an operational amplifier $OP_4$ connected in parallel to the capacitor $CP_{40}$. Reference voltages $V_{ref-1}$ and $V_{ref-2}$ of the operational amplifier $OP_4$ change between during the detection of the first touch panel unit 51 and during the detection of the second touch panel unit 52. A reset switch circuit $SW_{4C}$ is provided in parallel to the capacitor $CP_{40}$. A first switch unit $SW_{4A}$ is provided on the output side of the first touch panel unit 51, and a second switch unit $SW_{4B}$ is provided on the output side of the second touch panel unit 52. A first selection switch circuit $SW_{4D}$ and a second selection switch circuit $SW_{4E}$ for switching the reference voltages $V_{ref-1}$ and $V_{ref-2}$ are further provided.

Hereinafter, the operation of the detection unit 271 will be described. The reset switch circuit $SW_{4C}$ is placed in the on state every time before the operation starts to discharge the capacitor $CP_{40}$. During the operation of the detection unit 271, the switch circuit $SW_{4C}$ is in the off state. It is assumed that the pulse voltage $V_{com}$ is applied to the driving electrode 163.

During the detection of the first touch panel unit 51, the first switch unit $SW_{4A}$ and the first selection switch circuit $SW_{4D}$ are placed in the on state, and the second switch unit $SW_{4B}$ and the second selection switch circuit $SW_{4E}$ are placed in the off state. Accordingly, the following expression is obtained.

$$V_1' = V_{com} \cdot (C_{11}'/C_{40}) - V_{ref-1}$$

During the detection of the second touch panel unit 52, the second switch unit $SW_{4B}$ and the second selection switch circuit $SW_{4E}$ are placed in the on state, and the first switch unit $SW_{4A}$ and the first selection switch circuit $SW_{4D}$ are placed in the off state. Accordingly, $V_2' = V_{com} \cdot (C_{21}'/C_{40}) - V_{ref-2}$ is obtained. The outputs $V_1'$ and $V_2'$ of the detection unit 271 pass through an AD conversion circuit provided in the touch panel control unit 70 or various filters for removing noise, and are finally detected as the finger of the user touching the first touch panel unit 51 and the second touch panel unit 52. When the difference between the values of the capacitance $C_{11}'$ and $C_{21}'$ is large, the difference between the value of $V_1'$ and the value of $V_2'$ increases, and thus a high withstand voltage is required in the touch panel control unit 70. Incidentally, the reference voltages are switched, that is, the value of $V_{ref-1}$ and the value of $V_{ref-2}$ are optimized, thereby reducing the difference between the value of $V_1'$ and the value of $V_2'$. As a result, it is possible to reduce a withstand voltage which is required in the touch panel control unit 70.

Figure 32:
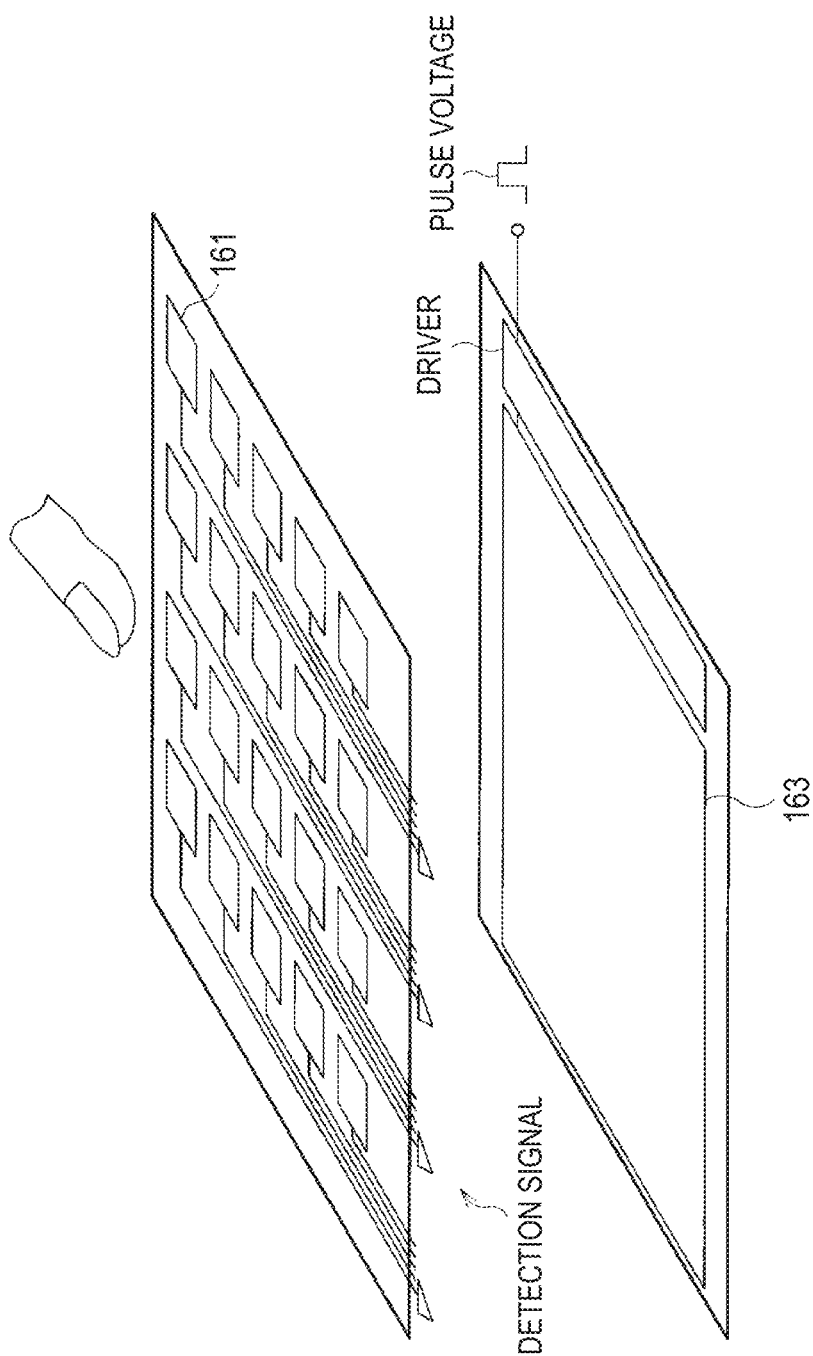
FIG. 32 is an exploded perspective view schematically showing another arrangement state of a first detection electrode and a driving electrode.
Figure 33:
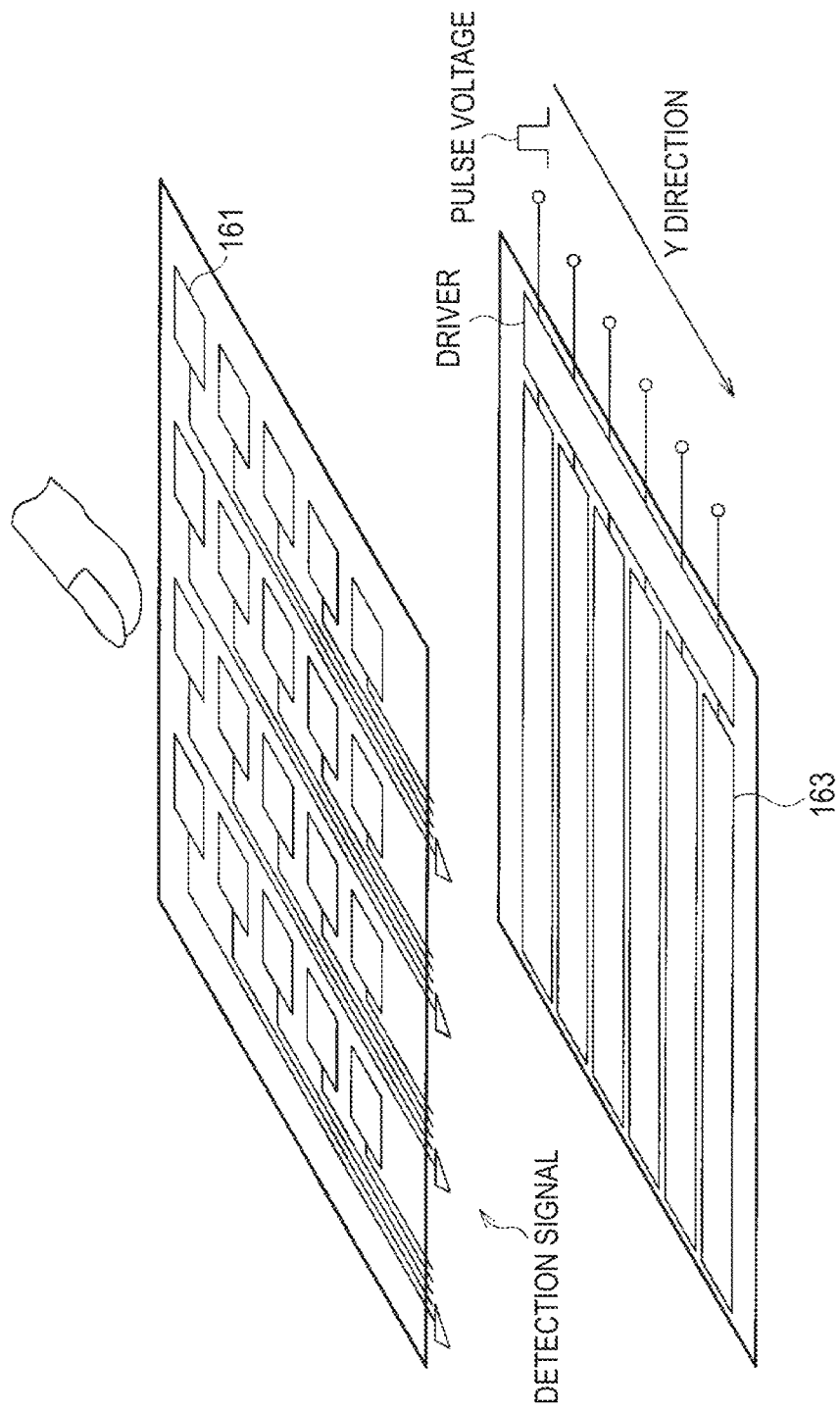
FIG. 33 is an exploded perspective view schematically showing still another arrangement state of a first detection electrode and a driving electrode.

Although the present disclosure has been described on the basis of the preferred examples, the present disclosure is not limited to these examples. The configuration or structure of the image display device, the touch panel unit, the detection unit, and the like is for illustration, and may be appropriately changed. Although in the examples, as shown in FIG. 31, the first detection electrode, the second detection electrode, and the driving electrode are patterned in a strip shape, the shape of the first detection electrode, the second detection electrode, and the driving electrode is not limited thereto. For example, as schematically shown in FIG. 32, in regard to the arrangement state (exploded perspective view) of the first detection electrode 161 and the driving electrode 163, the driving electrode 163 may be connected to the touch panel control unit 70 as a so-called solid electrode (a sheet of unpatterned electrode), the first detection electrode 161 may be a plurality of individual electrodes (rectangular electrodes) provided in a two-dimensional matrix, and the first detection electrodes 161 may be connected to the touch panel control unit 70 through wirings. Alternatively, as schematically shown in FIG. 33, in regard to the arrangement state (exploded perspective view) of the first detection electrode 161 and the driving electrode 163, the driving electrode 163 may be connected to the touch panel control unit 70 as the electrodes patterned in a strip shape as in the examples, the first detection electrode 161 may be a plurality of individual electrodes (rectangular electrodes) provided in a two-dimensional matrix, and the first detection electrodes 161 may be connected to the touch panel control unit 70 through wirings. The individual electrodes (rectangular electrodes) described above may be applied to the second detection electrode.

Figure 27A:
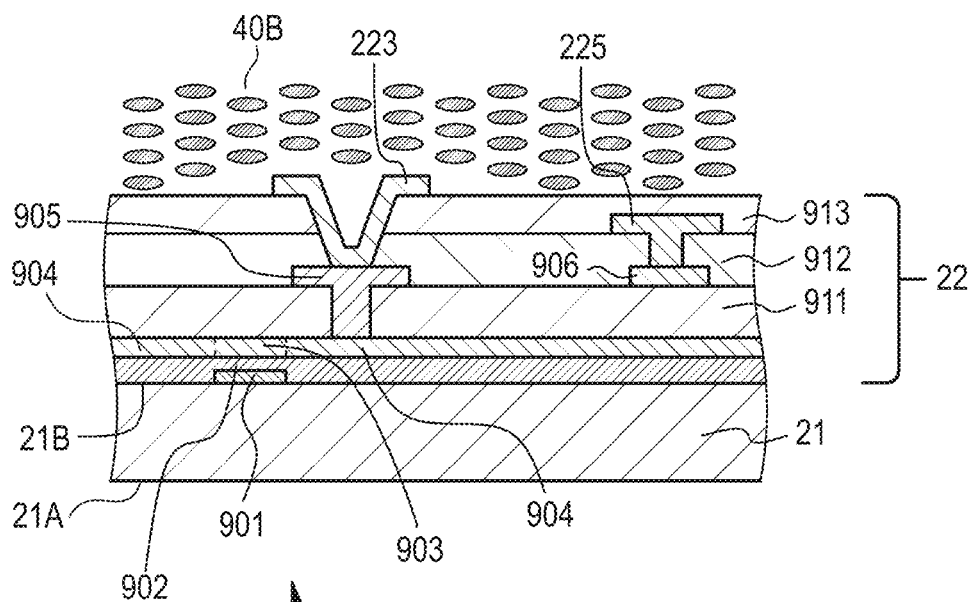
FIGS. 27A and 27B are schematic partial sectional views of a modification of a liquid crystal cell constituting the image display device of Examples 2 to 4 and 5 to 8.
Figure 27B:
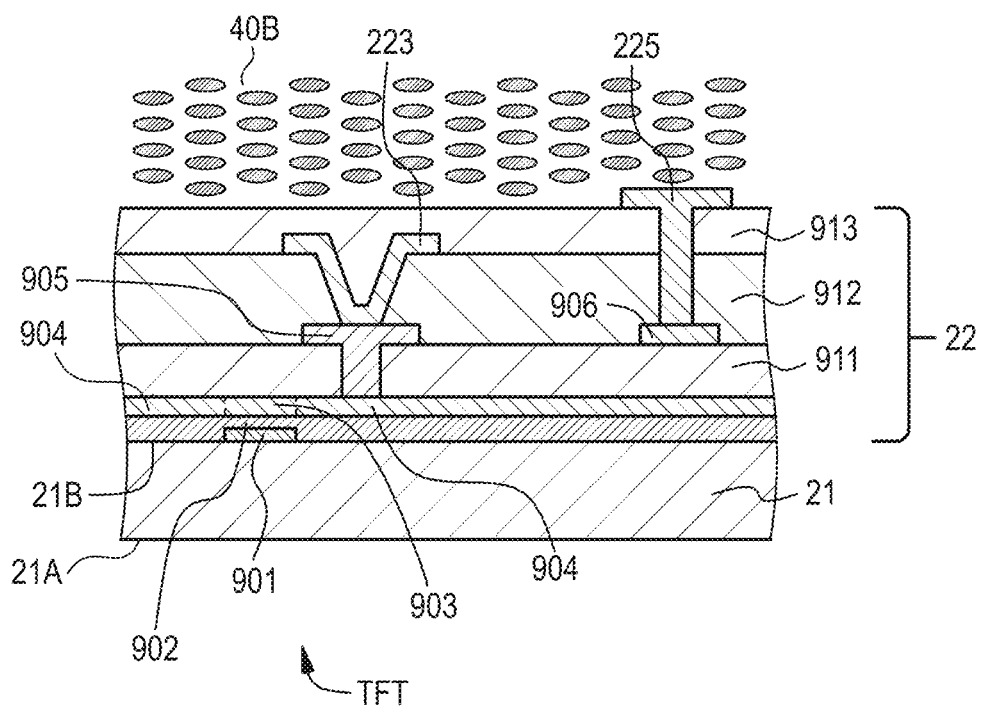

Although in Examples 2 to 4 and 6 to 8, when liquid crystal in a lateral electric field mode, such as FFS (fringe field switching) or IPS (in-plane switching), is used, the first electrode and the second electrode are provided on the first substrate, the present disclosure is not limited to a form in which the first electrode and the second electrode are formed within the same surface (the same plane) as shown in FIG. 26B. For example, description will be provided on the basis of the image display device of Example 2. As shown in FIG. 27A which is a schematic partial sectional view of a liquid crystal cell, a form in which the first electrode 223 is positioned on the upper side, and the second electrode 225 is positioned on the lower side may be made. The second electrode 225 is formed on the insulating interlayer (second insulating interlayer) 912, the second electrode 225 and the insulating interlayer 912 are coated with an insulating interlayer (third insulating interlayer) 913, and the first electrode 223 is formed on the insulating interlayer 913. The first electrode 223 is connected to the TFT through the contact hole 905. The second electrode 225 is connected to the driving circuit or the like through the wiring 906. Alternatively, as shown in FIG. 27B which is a schematic partial sectional view of a liquid crystal cell, a form in which the first electrode 223 is positioned on the lower side, and the second electrode 225 is positioned on the upper side may be made. The first electrode 223 is formed on the insulating interlayer (second insulating interlayer) 912, the first electrode 223 and the insulating interlayer 912 are coated with the insulating interlayer (third insulating interlayer) 913, and the second electrode 225 is formed on the insulating interlayer 913. The first electrode 223 is connected to the TFT through the contact hole 905. The second electrode 225 is connected to the driving circuit or the like through the wiring 906.

The present disclosure may be implemented as the following configuration.

[1]<<Image Display Device: <<First Embodiment>>

An image display device including a first substrate which has a first surface and a second surface facing the first surface, a second substrate which has a first surface and a second surface facing the first surface, the first surface being arranged to face the second surface of the first substrate, and is made of a transparent material, and an image display layer which is arranged between the first substrate and the second substrate, wherein a driving electrode is provided on the first surface of the second substrate, a plurality of first detection electrodes are provided on the second surface of the second substrate, a second detection electrode is provided on the first substrate, the first detection electrodes and the driving electrode constitute a capacitance-type first touch panel unit, and the second detection electrode and the driving electrode constitute a capacitance-type second touch panel unit.

[2]<<Image Display Device: Second Embodiment>>

An image display device including a first substrate which has a first surface and a second surface facing the first surface, a second substrate which has a first surface and a second surface facing the first surface, the first surface being arranged to face the second surface of the first substrate, and is made of a transparent material, and an image display layer which is arranged between the first substrate and the second substrate, wherein a driving electrode is provided on the second surface of the first substrate, a plurality of first detection electrodes are provided on the second substrate, a second detection electrode is provided on the first surface of the first substrate, the first detection electrodes and the driving electrode constitute a capacitance-type first touch panel unit, and the second detection electrode and the driving electrode constitute a capacitance-type second touch panel unit.

[3] The image display device described in [2], wherein the image display layer is a lateral-electric-field mode liquid crystal layer.

[4]<<Image Display Device: Third Embodiment>>

An image display device including a first substrate which has a first surface and a second surface facing the first surface, a second substrate which has a first surface and a second surface facing the first surface, the first surface being arranged to face the second surface of the first substrate, and is made of a transparent material, an image display layer which is made of liquid crystal arranged between the first substrate and the second substrate, and a sheet light source device which is arranged on the first surface of the first substrate, wherein a driving electrode is provided on the first surface of the second substrate, a plurality of first detection electrodes are provided on the second surface of the second substrate, a second detection electrode is provided on the sheet light source device, the first detection electrodes and the driving electrode constitute a capacitance-type first touch panel unit, and the second detection electrode and the driving electrode constitute a capacitance-type second touch panel unit.

[5]<<Image Display Device: Fourth Embodiment>>

An image display device including a first substrate which has a first surface and a second surface facing the first surface, a second substrate which has a first surface and a second surface facing the first surface, the first surface being arranged to face the second surface of the first substrate, and is made of a transparent material, an image display layer which is made of liquid crystal arranged between the first substrate and the second substrate, and a sheet light source device which is arranged on the first surface of the first substrate, wherein a driving electrode is provided on the second surface of the first substrate, a plurality of first detection electrodes are provided on the second substrate, a second detection electrode is provided on the sheet light source device, the first detection electrodes and the driving electrode constitute a capacitance-type first touch panel unit, and the second detection electrode and the driving electrode constitute a capacitance-type second touch panel unit.

[6] The image display device described in [5], wherein the image display layer is a lateral-electric-field mode liquid crystal layer.

[7] The image display device described in any one of [1] to [6], wherein a plurality of first detection electrodes and a plurality of second detection electrodes extend in a first direction, and a plurality of driving electrodes extend in a second direction different from the first direction.

[8] The image display device described in any one of [1] to [7], wherein the driving electrode doubles as an electrode for driving the image display layer.

[9] The image display device described in any one of [1] to [8], wherein each first detection electrode, the second detection electrode, and the driving electrode are connected to a detection unit, and the detection unit includes a first capacitor connected in series to a first capacitive unit constituted by the first detection electrode and the driving electrode, and a second capacitor connected in series to a second capacitive unit constituted by the second detection electrode and the driving electrode.

[10] The image display device described in [9], wherein the detection unit further includes a first operational amplifier connected in parallel to the first capacitor, and a second operational amplifier connected in parallel to the second capacitor.

[11] The image display device described in any one of [1] to [8], wherein each first detection electrode, the second detection electrode, and the driving electrode are connected to a detection unit, the detection unit includes a variable-capacitance capacitor connected in series to a first capacitive unit constituted by the first detection electrode and the driving electrode and a second capacitive unit constituted by the second detection electrode and the driving electrode, and the capacitance of the capacitor changes between during the detection of the first touch panel unit and during the detection of the second touch panel unit.

[12] The image display device described in [11], wherein the detection unit further includes an operational amplifier connected in parallel to the capacitor.

[13] The image display device described in any one of [1] to [8], wherein each first detection electrode, the second detection electrode, and the driving electrode are connected to a detection unit, the detection unit includes a capacitor connected in series to a first capacitive unit constituted by the first detection electrode and the driving electrode and a second capacitive unit constituted by the second detection electrode and the driving electrode, the detection unit further includes an operational amplifier connected in parallel to the capacitor, and a reference voltage of the operational amplifier changes between during the detection of the first touch panel unit and during the detection of the second touch panel unit.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image display device comprising:
a first substrate which has a lower surface side and a upper surface side;
a second substrate which has a lower surface side and a upper surface side, the lower surface side of the second substrate being arranged to face the upper surface side of the first substrate, and is made of a transparent material;
an image display layer which is made of liquid crystal arranged between the first substrate and the second substrate;
a plurality of pixel electrodes provided on the upper surface side of the first substrate; and
a sheet light source device which is arranged on the lower surface side of the first substrate,
wherein
a driving electrode is provided on the lower surface side of the second substrate,
a plurality of first detection electrodes are provided on the upper surface side of the second substrate,
a second detection electrode is provided on the lower surface side of the first substrate and layered on the sheet light source device, and a gap exists between the second detection electrode and the first substrate;
the sheet light source device, the second detection electrode, the first substrate, the pixel electrodes, the image display layer, the driving electrode, the second substrate, and the first detection electrodes are layered in this order,
the first detection electrodes and the driving electrode constitute a capacitance-type first touch panel unit, and
the second detection electrode and the driving electrode constitute a capacitance-type second touch panel unit.

2. The image display device according to claim 1, wherein the driving electrode doubles as an electrode for driving the image display layer.

3. The image display device according to claim 1, wherein each first detection electrode, the second detection electrode, and the driving electrode are connected to a detection unit, and
the detection unit includes a first capacitor connected in series to a first capacitive unit constituted by the first detection electrode and the driving electrode, and a second capacitor connected in series to a second capacitive unit constituted by the second detection electrode and the driving electrode.

4. The image display device according to claim 3, wherein the detection unit further includes a first operational amplifier connected in parallel to the first capacitor, and a second operational amplifier connected in parallel to the second capacitor.

5. The image display device according to claim 1, wherein each of the first detection electrode, the second detection electrode, and the driving electrode are connected to a detection unit,
the detection unit includes a variable-capacitance capacitor connected in series to a first capacitive unit constituted by the first detection electrode and the driving electrode and a second capacitive unit constituted by the second detection electrode and the driving electrode, and
the capacitance of the capacitor changes between the detection of the first touch panel unit and the detection of the second touch panel unit.

6. The image display device according to claim 5, wherein the detection unit further includes an operational amplifier connected in parallel to the capacitor.

7. The image display device according to claim 1, wherein each of the first detection electrode, the second detection electrode, and the driving electrode are connected to a detection unit,
the detection unit includes a capacitor connected in series to a first capacitive unit constituted by the first detection electrode and the driving electrode and a second capacitive unit constituted by the second detection electrode and the driving electrode,
the detection unit further includes an operational amplifier connected in parallel to the capacitor, and
a reference voltage of the operational amplifier changes between the detection of the first touch panel unit and the detection of the second touch panel unit.

8. An image display device comprising:
a first substrate which has a lower surface side and a upper surface side;
a second substrate which has a lower surface side and a upper surface side, the lower surface side of the second substrate being arranged to face the upper surface side of the first substrate, and is made of a transparent material;
a sheet light source device provided on the lower surface side of the first substrate;
a plurality of pixel electrodes provided on the upper surface side of the first substrate; and an image display layer which is configured as a lateral electric field mode liquid crystal layer and is arranged between the first substrate and the second substrate, wherein a driving electrode is provided on the lower surface side of the second substrate, a plurality of first detection electrodes are provided on the upper surface side of the second substrate, and the first substrate, a second detection electrode, the pixel electrodes, the image display layer, the driving electrode, the second substrate, and the first detection electrodes are layered in this order on the sheet light source device such that the second detection electrode is provided on the upper surface side of the first substrate and is layered between the drive electrodes and the sheet light source device, the first detection electrodes and the driving electrode constitute a capacitance-type first touch panel unit, and the second detection electrode and the driving electrode constitute a capacitance-type second touch panel unit.

* * * * *